US012762463B2

(12) United States Patent
Udupa et al.

(10) Patent No.: US 12,762,463 B2
(45) Date of Patent: Oct. 13, 2026

(54) MACHINE-LEARNING MODELS FOR GENERATING EMERGING USER SEGMENTS BASED ON ATTRIBUTES OF DIGITAL-SURVEY RESPONDENTS AND TARGET OUTCOMES

(71) Applicant: Qualtrics, LLC, Provo, UT (US)

(72) Inventors: Sharath Kodi Udupa, Seattle, WA (US); Liang Yu, Seattle, WA (US); Ben Alton, Orem, UT (US)

(73) Assignee: Qualtrics, LLC, Provo, UT (US)

( * ) Notice: Subject to any disclaimer, the term of this patent is extended or adjusted under 35 U.S.C. 154(b) by 966 days.

(21) Appl. No.: 17/393,032

(22) Filed: Aug. 3, 2021

(65) Prior Publication Data

US 2023/0039338 A1 Feb. 9, 2023

(51) Int. Cl.

| | |
|---|---|
| ***G06N 20/00*** | (2019.01) |
| ***G06F 3/0484*** | (2022.01) |
| ***G06Q 30/0201*** | (2023.01) |
| ***G06Q 30/0204*** | (2023.01) |

(52) U.S. Cl.

CPC ........... *G06N 20/00* (2019.01); *G06F 3/0484* (2013.01); *G06Q 30/0201* (2013.01); *G06Q 30/0204* (2013.01)

(58) Field of Classification Search

CPC ........ G06F 3/048; G06F 3/0484–0486; G06Q 30/02; G06Q 30/0204; G06Q 30/02

See application file for complete search history.

(56) References Cited

U.S. PATENT DOCUMENTS

| | | | | |
|---|---|---|---|---|
| 10,715,668 | B1 * | 7/2020 | Jayapalan | G06Q 30/01 |
| 11,501,060 | B1 | 11/2022 | Jain et al. | |
| 2010/0145772 | A1 * | 6/2010 | McCauley | G06Q 30/02 714/48 |
| 2014/0067472 | A1 * | 3/2014 | Mayes | G06Q 30/0203 705/7.32 |
| 2016/0275533 | A1 * | 9/2016 | Smith | G06Q 30/0204 |
| 2016/0352900 | A1 * | 12/2016 | Bell | H04M 3/5175 |

(Continued)

OTHER PUBLICATIONS

Lee, Jang Hee, and Sang Chan Park. "Intelligent profitable customers segmentation system based on business intelligence tools." Expert systems with applications 29.1 (2005): 145-152. (Year: 2005).*

(Continued)

*Primary Examiner* — Liang Y Li
(74) *Attorney, Agent, or Firm* — Keller Preece PLLC

(57) ABSTRACT

The present disclosure relates to systems, non-transitory computer-readable media, and methods that utilize a specially trained machine-learning model to generate an emerging user segment based on a target outcome for digital survey responses and respondent attributes of respondents to such digital surveys. In some cases, for instance, the emerging user segment includes a group of users that share the same or similar characteristics as the subset of respondents. By analyzing respondent attributes of digital survey respondents that match a target outcome, the disclosed systems can use the specially trained machine-learning model to dynamically predict users that likely have (or are at risk of having) the same or a similar target outcome—even if such users did not respond to the relevant digital survey.

20 Claims, 13 Drawing Sheets

(56) References Cited

U.S. PATENT DOCUMENTS

| | | | | |
|---|---|---|---|---|
| 2018/0060890 | A1 | 3/2018 | Noter et al. | |
| 2019/0066136 | A1 | 2/2019 | Kopikare | |
| 2019/0164182 | A1 | 5/2019 | Abdullah et al. | |
| 2019/0188753 | A1 | 6/2019 | McConnell et al. | |
| 2019/0347668 | A1 | 11/2019 | Williams et al. | |
| 2020/0019561 | A1 | 1/2020 | Doyle | |
| 2020/0104395 | A1* | 4/2020 | Bhatia | G06F 16/26 |
| 2020/0202369 | A1 | 6/2020 | Datta | |
| 2020/0364245 | A1* | 11/2020 | Sinha | G06F 3/0482 |
| 2020/0402082 | A1 | 12/2020 | Votava et al. | |
| 2021/0081759 | A1* | 3/2021 | Zhao | G06Q 20/127 |
| 2021/0090103 | A1 | 3/2021 | Deshmukh et al. | |
| 2021/0150548 | A1* | 5/2021 | Dua | G06F 18/2113 |
| 2021/0165931 | A1* | 6/2021 | Fuerst | G06F 30/20 |
| 2021/0182282 | A1 | 6/2021 | Silverstein et al. | |
| 2022/0207430 | A1* | 6/2022 | Dickie | G06N 5/01 |
| 2023/0267507 | A1* | 8/2023 | Chaar | G06Q 30/0251<br>705/7.33 |

OTHER PUBLICATIONS

Galera Cluster for MYSQL; Date downloaded Aug. 19, 2020; https://galeracluster.com.
U.S. Appl. No. 16/928,897, Feb. 16, 2023, Office Action.
U.S. Appl. No. 16/928,897, Jun. 17, 2022, Office Action.
U.S. Appl. No. 16/928,897, Jun. 13, 2023, Office Action.
U.S. Appl. No. 16/928,897, Jan. 2, 2024, Office Action.
U.S. Appl. No. 16/928,897, Jan. 6, 2022, Office Action.
U.S. Appl. No. 18/929,363, Feb. 25, 2026, Office Action.
U.S. Appl. No. 16/928,897, Jun. 26, 2024, Office Action.
U.S. Appl. No. 18/929,363 filed Jul. 20, 2026, Office Action.

* cited by examiner

MACHINE-LEARNING MODELS FOR GENERATING EMERGING USER SEGMENTS BASED ON ATTRIBUTES OF DIGITAL-SURVEY RESPONDENTS AND TARGET OUTCOMES

BACKGROUND

In recent years, computer systems have improved at analyzing attributes of client devices (and corresponding users) for distributing digital content to such client devices across computer networks. For example, conventional segmentation systems often employ segment-builder applications with tools to select digital input traits or attributes for generating a corresponding segment population. Despite improvements and an expansion of segment-building tools, conventional segmentation systems often employ overly complex user-interface tools for segment building, irrelevant or overly broad input traits for segment models, and rigid computational models that inhibit and overly complicate discovering nascent segments.

For example, some conventional segmentation systems display a seemingly endless number of options or tools (e.g., across an array of button menus, drop-down selections, or feature tabs) in complex graphical user interfaces. These complex user-interface tools often require an inordinate number of navigational inputs from a client device to find the proper tool, let alone the myriad different application inputs to apply the selected tool or feature. For example, to build highly unique segments, some conventional segmentation systems further require application of complex relational operators for time relationships, sophisticated selections of numerous dimensions and metrics, and/or identifying nuanced dependencies between datasets—all in order to build a user segment.

In addition to overly complex segment-builder user interfaces, some conventional segmentation systems are inefficient and waste computing resources to analyze too many and/or inapplicable digital input traits. Indeed, some conventional segmentation systems expend tremendous computing resources (e.g., system processing bandwidth and/or memory) to build segments based on a variety of (or all) digital input traits. However, at least some of the analyzed digital input traits are often non-deterministic or even unrelated to forming a segment of users. Additionally or alternatively, conventional segmentation systems analyze at least some digital input traits that are untethered from user-selected preferences to form a certain type of segment. Thus, conventional segmentation systems often waste computer resources to generate segments that are less meaningful and/or disengaging within a graphical user interface.

In addition, conventional segmentation systems often lack the artificial intelligence and/or computational flexibility to provide meaningful insights for a variety of different datasets. To illustrate, some conventional segmentation systems analyze raw data from outside computing systems that use different or customized data fields and codes. Because some conventional segmentation systems cannot parse such different or customized data, conventional systems often limited or generic segments that cannot account for certain data or must rely on customized conversions of data fields and codes. Further, some conventional segmentation systems are highly customized to identify specific features of a dataset. In addition to the complex user interfaces noted above, some conventional segmentation systems are developed for specific technological interactions only, such as website visits or webpage visits. However, these conventional segmentation systems cannot intelligently analyze data for other feature domains, thereby severely limiting scope and application of such systems.

BRIEF SUMMARY

This disclosure describes embodiments of systems, non-transitory computer-readable media, and methods that solve one or more of the foregoing problems in the art or provide other benefits described herein. In particular, the disclosed systems utilize a specially trained machine-learning model to generate an emerging user segment based on a target outcome for digital survey responses and respondent attributes of respondents to such digital surveys. In some cases, the emerging user segment includes a group of users that share the same or similar characteristics as the subset of respondents. By analyzing respondent attributes of digital survey respondents that match a target outcome, the disclosed systems can use the specially trained machine-learning model to dynamically predict users that likely have (or are at risk of having) the same or a similar target outcome—even if such users did not respond to the relevant digital survey.

After generating an emerging user segment, the disclosed systems can integrate the emerging user segment into several graphical-user-interface applications and downstream actions targeting the emerging user segment. For instance, the disclosed systems can recommend the emerging user segment for display within a graphical user interface of a client device. In response to a user interaction to add the emerging user segment, the disclosed systems can add the emerging user segment to a dashboard user interface—or else remove the emerging user segment from display and delete from memory. In certain implementations, the disclosed systems then perform a digital action based on the emerging user segment, such as provide a targeted digital survey or generate a digital ticket.

This disclosure outlines additional features and advantages of one or more embodiments of the present disclosure in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
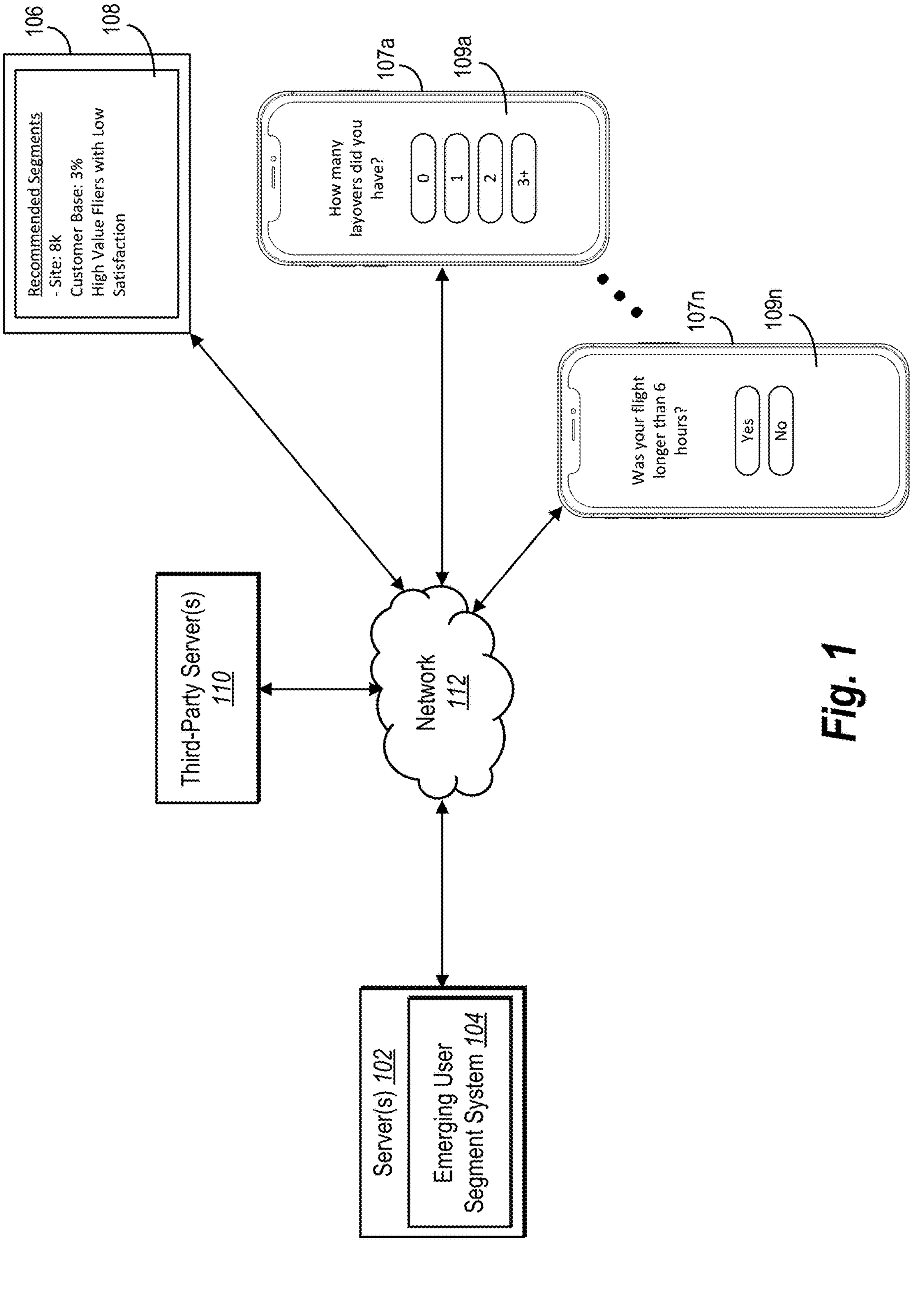
FIG. 1 illustrates a computing system environment for implementing an emerging user segment system in accordance with one or more embodiments.

This disclosure describes one or more embodiments of an emerging user segment system that utilizes a machine-learning model to identify an emerging user segment exhibiting certain attributes identified from digital-survey respondents that correspond to a target outcome. For example, the emerging user segment system identifies a target outcome corresponding to certain digital-survey responses, respondent attributes for corresponding respondents, and a target outcome. Based on the respondent attributes for respondents with survey responses that match (or correspond to) the target outcome, the emerging user segment system utilizes a machine-learning model to intelligently identify an emerging segment of users that exhibit the respondent attributes. In some cases, the emerging user segment includes one or both of digital-survey respondents and users that have not respondent to the relevant digital surveys exhibiting the relevant respondent attributes. Further, in certain implementations, the emerging user segment system surfaces an intuitive segment visualization for display that includes graphics, plain text description, statistical indicators, and/or a selectable option to add the emerging user segment.

As noted above, in some embodiments, the emerging user segment system implements a targeted data-analytics approach that identifies target outcomes associated with survey responses to a digital survey. For example, as part of a pre-processing step, the emerging user segment system identifies, retrieves, filters, generates, requests, and/or stores a target outcome. In particular embodiments, the emerging user segment system identifies a target outcome based on user input. For instance, the user input may indicate a target outcome comprising a range of customer satisfaction scores, user-exit-threshold probabilities (e.g., churn probabilities), etc. Additionally or alternatively, the user input may provide target outcome guidance or hints to generate a target outcome in a certain way, such as a target outcome for a specific digital survey, a specific survey question, and/or a specific survey response.

Rather than use a user-selection target outcome, in certain embodiments, the emerging user segment system generates or selects a target outcome for a user. For example, the emerging user segment system can generate a target outcome based on industry characteristics or organization characteristics corresponding to an organization associated with a digital survey. Accordingly, in some embodiments, the emerging user segment system identifies a target outcome for a user with minimal or no user input identifying the relevant target outcome.

Similarly, in some embodiments, the emerging user segment system identifies respondent attributes with minimal or no user input identifying the relevant respondent attributes. In some embodiments, for instance, the user input specifies respondent attributes of interest. In other embodiments, the emerging user segment system automatically identifies (e.g., without user input) respondent attributes by utilizing a machine-learning model to intelligently determine which respondent attributes are deterministic for a target outcome. For example, the emerging user segment system can predict certain respondent attributes (e.g., age, city of residence, flight duration, airline, seat number) satisfy a deterministic threshold or certain respondent attributes corresponding to industry characteristics or organization characteristics for an organization.

As suggested above, the emerging user segment system uses survey responses to identify respondent attributes relevant to a target outcome. In one or more embodiments, for instance, the emerging user segment system filters the survey responses based on one or more of the target outcome or the respondent attributes to identify a subset of survey responses. For example, in certain embodiments, the emerging user segment system selects only the survey responses corresponding to the respondent attributes and/or the target outcome.

Based on the identified survey responses, target outcome, and respondent attributes, the emerging user segment system can use a machine-learning model to generate an emerging user segment. For example, the emerging user segment system can utilize a decision tree, a neural network, and/or a variety of other machine-learning models trained to predict an emerging user segment. To illustrate, the machine-learning model may include nodes, layers, weights, parameters, etc. that in combination are tuned to provide a predicted emerging user segment (or classification scores for multiple emerging user segments).

After generating an emerging user segment, in certain implementations, the emerging user segment system generates a segment visualization of the emerging user segment. For example, the emerging user segment system provides a confidence score, error probability, or other metric to gauge efficacy of the emerging user segment. As another example, the emerging user segment system generates a segment visualization comprising a textual description that intuitively describes the emerging user segment (e.g., using domain language according to a schematization mapping). In yet another example, the emerging user segment system generates a segment visualization comprising statistical indicators or analyses relative to one or more other datasets. For example, the emerging user segment may include insights regarding a particular industry or certain elements of cross-customer data, such as a specific customer base or a specific competitor product. Still further, in some cases, the emerging user segment system generates a segment visualization comprising a selectable option to add the emerging user segment to a dashboard user interface (or otherwise save the emerging user segment for subsequent tracking).

Having generated and visualized an emerging user segment, the emerging user segment system can perform one or more digital actions for the emerging user segment. For example, the emerging user segment system can transmit an electronic communication in the form of targeted digital content distribution, a digital survey, or a digital notification/alert to further or prevent a target outcome. As additional examples, the emerging user segment system can generate a digital survey tailored to the emerging user segment. Still further, the emerging user segment system can update, within a graphical user interface, segment characteristics of the emerging user segment, such as segment size, lifetime value, customer satisfaction score, etc.

As discussed above, conventional segmentation systems, demonstrate a number of technical problems and shortcomings. The emerging user segment system can provide a number of improvements over these and other conventional systems. For example, unlike the complex tools of conventional segmentation systems, the disclosed systems implement a computational framework that simplifies the user interface by intelligently determining and presenting simple options for generating a relevant user segment. By removing or simplifying complex user inputs, the emerging user segment system can provide a more streamlined, user-friendly user interface and expand an emerging-user-segment analysis to a wide variety of different datasets and feature domains.

To illustrate, in certain embodiments, the emerging user segment system automatically identifies a target outcome associated with survey responses based on limited user input of factors relevant to a target outcome. Under this broadly applicable approach, the emerging user segment system can generate an emerging user segment on the fly without underlying meaning and context of survey responses. As another example, the emerging user segment system automatically generates the target outcome without user interaction based on survey responses corresponding to the user account, characteristics of the user account or organization, and/or a schematization mapping. Under this approach, the emerging user segment system can provide more detailed, effective recommendations of emerging user segments by properly incorporating defined fields in a textual description of a segment visualization for the emerging user segment.

In addition to an improved user-friendly interface, in some embodiments, the disclosed systems implement a first-of-its-kind machine-learning model that can analyze one or more of a target outcome, survey respondent attributes, and/or digital survey responses to generate an emerging user segment. In particular, this first-of-its-kind machine-learning model is specially trained to identify users that are part of an emerging user segment because they share the same or similar attributes as respondents with digital survey responses matching a target outcome—despite the identified users not responding to a digital survey. Specifically, once trained, the disclosed machine-learning model can identify non-respondents with characteristics similar to the respondent attributes of users that provided digital survey responses.

In addition to improved system flexibility and a first-of-its-kind machine-learning model, the emerging user segment system can improve a processing efficiency (e.g., computing speed or processing overhead) of implementing computing devices. In particular, the emerging user segment system can identify a target outcome associated with survey responses to one or more digital surveys to determine which attributes and survey responses are important and which are less important. Unlike conventional segmentation systems that analyze an excessive number of different attributes and/or other inputs, the emerging user segment system can limit processing (using a machine-learning model) to only those attributes and survey responses that are deterministic or contribute to the target outcome. For example, the emerging user segment system can select a subset of survey responses provided by respondent devices of the respondents based on the target outcome. With increased processing efficiency, the emerging user segment system can also increase system bandwidth to perform additional or alternative acts.

Independent of a target outcome, the emerging user segment system can also use a machine-learning model to intelligently learn or tune certain weights, nodes, layers, or parameters to determine which attributes and survey responses are important and which are less important. Therefore, unlike conventional segmentation systems, the emerging user segment system is intelligent enough to reduce a number of inputs (e.g., attributes and survey responses) and focus on the deterministic inputs. By reducing the number of inputs, the emerging user segment system can similarly improve a processing efficiency of implementing computing devices as described above.

As illustrated by the foregoing discussion, the present disclosure utilizes a variety of terms to describe features and benefits of the emerging user segment system. For example, as used herein, the term "emerging user segment" refers to a classification, group, or category of users. In particular, an emerging user segment can include a classification, group, or category of users defined by one or more attributes (e.g., traits or characteristics) associated with a user or client device. For instance, an emerging user segment can refer to a particular population of users associated with the same attributes or a common attribute. In certain implementations, an emerging user segment includes users that responded to a digital survey as well as users that did not respond to the digital survey that share one or more common attributes.

As used herein, the term "digital survey" refers to an electronic communication that collects information concerning one or more respondents by capturing information from (or posing questions to) such respondents. For instance, digital surveys include electronic communications that prompt or request survey responses (e.g., answers, digital information, feedback, statements, opinions, problems, ratings) via one or more digital channels such as SMS message, instant message, e-mail, social media posts, etc. Examples of digital surveys can include questionnaires, digital polls, requests for ratings, market research surveys, employee satisfaction surveys, job satisfaction surveys, customer satisfaction surveys, exit interview forms, brand awareness surveys, product surveys, evaluation surveys, etc.

As used herein, the term "target outcome" refers to an event, a goal, or a result associated with a digital survey. In particular, a target outcome refers to respondent attribute criteria, event criteria, result criteria, or goal criteria associated with survey responses and/or respondents of digital surveys. In particular embodiments, a target outcome includes criteria for identifying a subset of respondents to a digital survey, whereby attributes of the subset of respondents can be used to identify nonrespondents to the digital survey for generating an emerging user segment. For example, a target outcome can include users or organizations (e.g., entities) that, based on survey responses to a digital survey, satisfy a certain parameter, objective, goal, sentiment, estimate, constraint, count, or number of instances. Example target outcomes include a range of customer satisfaction scores, a chance that users churn out of an organization, high-value clients associated with an apathetic sentiment. In certain implementations, administrators provide a target outcome as input guidance for a machine-learning model to generate an emerging user segment.

In addition, as used herein, the term "respondent attributes" refers to traits or characteristics associated with one or more users or client devices. In particular, respondent attributes can include traits or characteristics corresponding to users or client devices that provide survey responses to a digital survey. To illustrate, respondent attributes can include qualities, such as age, gender, location, type of computing device, type of operating system, subscription status with respect to an online service or computer application, interaction event (e.g. an event from an interaction history), purchase event (e.g., an event from a purchase history), preference, or interest.

Relatedly, the term "candidate respondent attributes" refers to potential traits or characteristics corresponding to users or client devices for use in determining an emerging user segment. In some cases, candidate respondent attributes include potential traits or characteristics corresponding to users or client devices that provide survey responses to a digital survey, but are not necessarily selected for determining an emerging user segment. In certain implementations, respondent attributes are selected from candidate respondent attributes.

Further, the term "industry characteristics" refers to traits or qualities of an industry or sector. For example, industry characteristics can include traits or qualities for a group of organizations corresponding to a particular field, such as information technology, healthcare, financials, consumer discretionary, communications services, industrials, consumer staples, energy, utilities, real estate, or materials. Relatedly, the term "organization characteristics" refers to traits or qualities of a specific organization, such as type of entity, place of business, number of employees, marketable products, services offered, etc.

As used herein, a "machine learning model" refers to a computer representation that can be tuned (e.g., trained) based on inputs to approximate unknown functions. For instance, a machine-learning model can include, but is not limited to, a differentiable function approximator, a neural network (e.g., a convolutional neural network or deep learning model), a decision tree (e.g., a gradient boosted decision tree), a linear regression model, a logistic regression model, a clustering model, association rule learning, inductive logic programming, support vector learning, Bayesian network, regression-based model, principal component analysis, or a combination thereof.

In addition, as used here, the term "segment visualization" refers to a digital graphic or textual representation (or description) of an emerging user segment or characteristic of the emerging user segment. In particular, a segment visualization can include textual description, graphics, segment characteristics (e.g., segment size, customer satisfaction scores), etc. that describe or represent an emerging user segment. For example, a segment visualization can include a chart, graph, plot, index, table, icon, image, alphanumeric values, video, interactive object, etc. that represents data for an emerging user segment.

As also used herein, the term "customer satisfaction score" refers to a digital metric indicating sentiment of one or more users. For example, a customer satisfaction score may include one or more metrics indicating a rating, a willingness to recommend, a satisfaction of user interaction, or other contentment measurement with respect to a topic of a digital survey. Additionally or alternatively, a customer satisfaction score may include a value determined according to one or more algorithms.

As used herein, the term "schematization mapping" refers to a data structure for aligning fields. In particular embodiments, a digital mapping can include a data structure for storing mapping pairs or field assignments that relate a survey field to a repository field. For example, a digital mapping may include mapping pairs arranged in an index, vector, table, nodal graph, data tree, etc.

In addition, as used herein, the term "field" refers to a digital element, region, or unit for storing digital data entries. For example, a field can include a cell, row, column, box, or line (e.g., in a digital survey, database, array, storage repository, or user interface). A field can include a variety of user interface elements, such as a text box that portrays digital information via a display screen. As additional examples, a field can include the spatial regions that correspond to a label, category, tab, or folder.

As further used herein, the term "digital action" refers to an act, modification, process, or operation in relation to an emerging user segment. In particular, a digital action can include a variety of actions, modifications, processes, or operations that use an emerging user segment or are responsive to identifying the emerging user segment. For example, a digital action can include transmitting an electronic communication, generating a digital survey, updating segment characteristics of an emerging user segment, or generating a digital ticket.

Additional detail will now be provided in relation to illustrative figures portraying example embodiments and implementations of the persona group system. For example, FIG. 1 illustrates a computing system environment (or "environment") 100 for implementing an emerging user segment system 104 in accordance with one or more embodiments. As shown in FIG. 1, the environment 100 includes server(s) 102, administrator client device 106, and respondent client devices 107*a*-107*n*, third-party server(s) 110, and a network 112.

As depicted in FIG. 1, the server(s) 102, the administrator client device 106, the respondent client devices 107*a*-107*n*, and the third-party server(s) 110 are communicatively coupled with each other either directly or indirectly through the network 112 (as discussed in greater detail below in relation to FIG. 8). Additionally, in some embodiments, the server(s) 102, the administrator client device 106, the respondent client devices 107*a*-107*n*, and the third-party server(s) 110 include a variety of computing devices (including one or more computing devices as discussed in greater detail with relation to FIG. 8).

As mentioned above, the environment 100 includes the server(s) 102. In one or more embodiments, the server(s) 102 generate, store, receive, and/or transmit digital data, including digital data related to emerging user segments. For example, in certain implementations, the server(s) 102 receive, in response to a digital survey, survey responses from the respondent client devices 107*a*-107*n*. Further, in some embodiments, the server(s) 102 receive user input from the administrator client device 106 providing a target outcome and/or respondent attributes. In one or more embodiments, the server(s) 102 comprise a data server. The server(s) 102 can also comprise a communication server or a web-hosting server.

Additionally, the server(s) 102 include the emerging user segment system 104. In particular, in one or more embodiments, the emerging user segment system 104 identifies a target outcome associated with survey responses to one or more digital surveys and respondent attributes associated with respondents. Additionally, for example, the emerging user segment system 104 selects a subset of survey responses provided by respondent devices of the respondents based on one or more of the target outcome or the respondent attributes. Subsequently, in one or more embodiments, the emerging user segment system 104 generates, utilizing a machine-learning model, an emerging user segment based on the target outcome, the respondent attributes, and the subset of survey responses. Additionally, the emerging user segment system 104 provides a segment visualization of the emerging user segment for display within a graphical user interface of a client device, such as the administrator client device 106.

As shown in FIG. 1, the environment 100 includes the administrator client device 106 and the respondent client devices 107*a*-107*n*. In certain embodiments, the administrator client device 106 and the respondent client devices 107*a*-107*n* include smartphones, tablets, desktop computers, laptop computers, head-mounted-display devices, smart watches, or other electronic devices.

In some embodiments, the administrator client device 106 includes an administrator client application 108 that can access and display digital data related to one or more users (e.g., a segment visualization). Similarly, for instance, the respondent client devices 107*a*-107*n* include respondent client applications 109*a*-109*n* that allow users to interact with digital surveys and provide survey responses. In particular embodiments, the administrator client application 108 and/or the respondent client applications 109*a*-109*n* include software applications respectively installed on the implementing devices. Additionally, or alternatively, the administrator client application 108 and/or the respondent client applications 109*a*-109*n* can include a web browser or other application that accesses a software application hosted on the server(s) 102.

In one or more embodiments, the third-party server(s) 110 correspond to customer servers, client servers, or servers for other entities. For instance, the third-party server(s) 110 can include an organization server that corresponds to the respondent client devices 107*a*-107*n*. Accordingly, in some embodiments, the third-party server(s) 110 receive digital surveys from the server(s) 102 to distribute to one or more client devices for the organization.

In some embodiments, the third-party server(s) 110 host a storage database for storing digital content (e.g., survey responses, machine-learning models). Additionally or alternatively, the third-party server(s) 110 comprise a digital content distribution server for distributing digital content or tracking, detecting, storing, or otherwise identifying other digital data (e.g., clickstream data) provided by users via client devices.

The emerging user segment system 104 can be implemented in whole, or in part, by the individual elements of the environment 100. Indeed, although FIG. 1 illustrates the emerging user segment system 104 implemented with regard to the server(s) 102, different components of the emerging user segment system 104 can be implemented by a variety of devices within the environment 100. For example, one or more (or all) components of the emerging user segment system 104 can be implemented by a different computing device (e.g., one or more of the respondent client devices 107*a*-107*n* or the administrator client device 106) or a separate server from the server(s) 102 (e.g., the third-party server(s) 110).

Although the environment 100 of FIG. 1 is depicted as having a particular number of components, the environment 100 can have any number of additional or alternative components (e.g., any number of servers, administrator devices, client devices, databases, third-party servers, or other components in communication with the emerging user segment system 104 via the network 112). For example, although not shown, the environment 100 may include one or more analytics databases storing survey response data, anonymized (e.g., scrubbed) data, etc. Similarly, various additional or alternative arrangements are possible, although FIG. 1 illustrates a particular arrangement of the server(s) 102, the respondent client devices 107*a*-107*n*, the administrator client device 106, and the third-party server(s) 110.

As mentioned above, the emerging user segment system 104 can identify survey responses, respondent attributes, and target outcomes to intelligently predict an emerging user segment utilizing a machine-learning model. Based on the emerging user segment, the emerging user segment system 104 can provide a segment visualization for display within a graphical user interface. In accordance with one or more embodiments, FIG. 2 illustrates the emerging user segment system 104 generating an emerging user segment 215 for providing a segment visualization.

Figure 2:
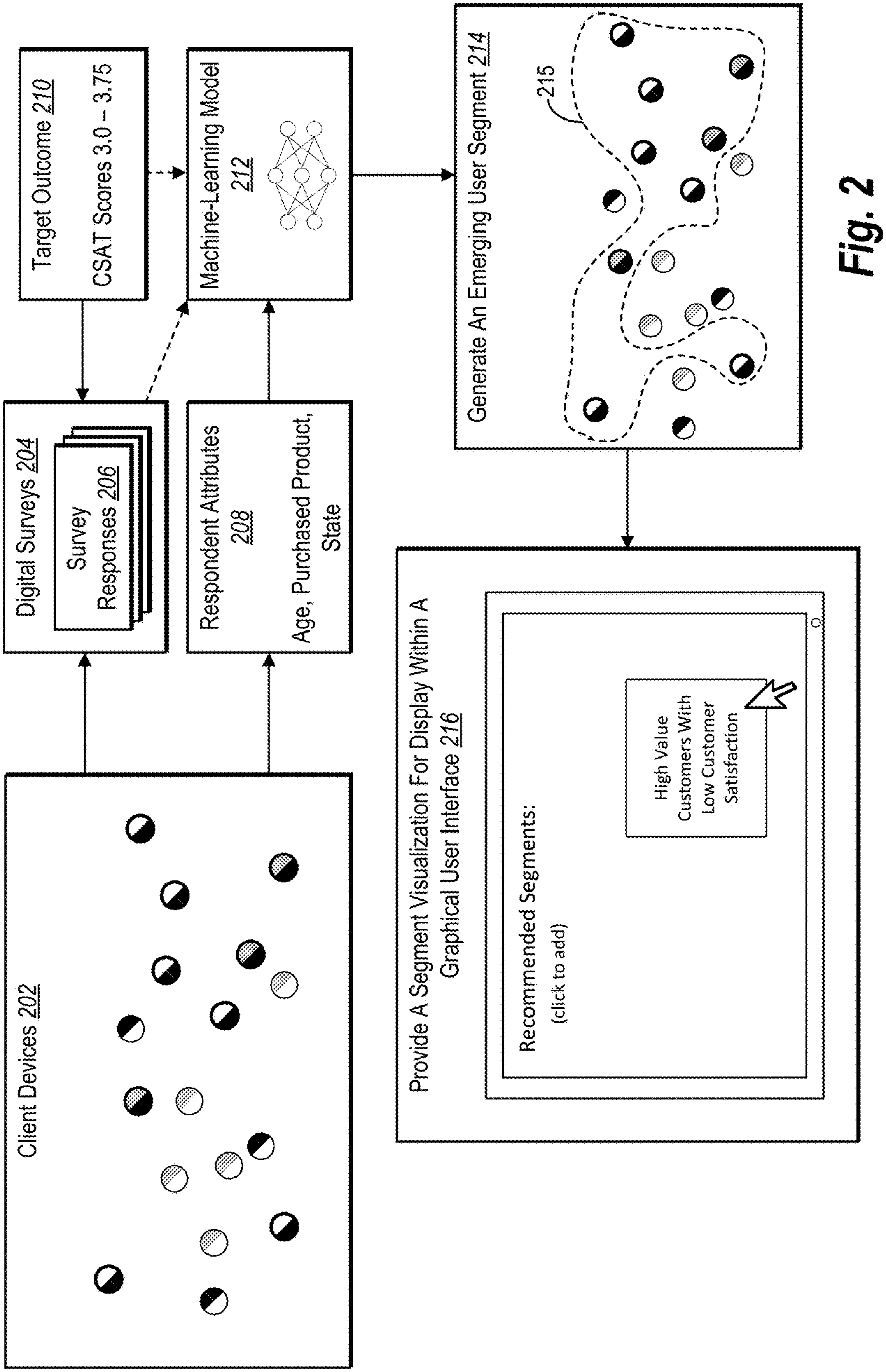
FIG. 2 illustrates an emerging user segment system utilizing a machine-learning model to generate an emerging user segment for providing a segment visualization in accordance with one or more embodiments.

As shown in FIG. 2, the emerging user segment system 104 identifies a target outcome 210. In certain implementations, the target outcome 210 includes respondent attribute criteria, event criteria, result criteria, or goal criteria associated with the survey responses 206 and/or respondents of the digital surveys 204. In particular embodiments, the target outcome 210 may include datasets (e.g., survey responses, customer satisfaction scores, employment exits) that implicate specific digital surveys and/or survey responses of corresponding users to provide to the machine-learning model 212. Additionally or alternatively, the target outcome 210 may identify or implicate specific digital surveys and/or survey responses of corresponding users to identify the respondent attributes 208 as described below. As some particular examples of a target outcome, the target outcome 210 may include datasets that, based on the survey responses 206, satisfy a certain parameter, objective, goal, sentiment, estimate, constraint, count, or number of instances. For example, the target outcome 210 includes a list identifying all users associated with those of the client devices 202 that provided survey responses indicating customer satisfaction scores in the range of "3.0-3.75."

In addition, the emerging user segment system 104 identifies digital surveys 204 and corresponding survey responses 206. In particular embodiments, the emerging user segment system 104 identifies, from one or more client devices 202, the survey responses 206 to the digital surveys 204. In certain embodiments, the survey responses 206 include digital selections, answers, or indications of user inputs identifying specific responses (or non-responses) to survey questions included in the digital surveys 204. Additionally, in some instances, the emerging user segment system 104 identifies at least one of the digital surveys 204 or the survey responses 206 based on the target outcome 210 providing a list of relevant surveys and/or survey questions.

As further shown in FIG. 2, the emerging user segment system 104 identifies respondent attributes 208 corresponding to the survey responses 206. In one or more embodiments, the respondent attributes 208 include traits or characteristics corresponding to the client devices 202 (or associated users) that provide the survey responses 206. For example, the respondent attributes 208 can include qualities such as age, gender, location, type of computing device, purchased product, and/or myriad others. Accordingly, the different shades and configurations of black, white, and gray circles represent the various qualities or characteristics of the client devices 202 (or associated users).

At an act 214, a machine-learning model 212 uses one or more of the foregoing inputs to generate the emerging user segment 215. For example, the machine-learning model 212 generates the emerging user segment 215 by analyzing the respondent attributes 208 and, in some instances, the digital surveys 204 and the target outcome 210. In particular embodiments, the machine-learning model 212 generates the emerging user segment 215 comprising a set users exhibiting the respondent attributes 208 or similar attributes. In some cases, the emerging user segment 215 includes users not associated with the client devices 202 that responded to the digital surveys 204. Accordingly, the emerging user segment 215 may include respondents and/or non-respondents that satisfy (e.g., match or are similar to) the respondent attributes 208 and/or the target outcome 210. For example, the machine-learning model 212 can predict that certain non-respondents look like respondents corresponding to CSAT scores between "3.0-3.75" and therefore should be grouped within the emerging user segment 215.

For instance, as illustrated in FIG. 2, the emerging user segment system 104 generates the emerging user segment 215 by identifying matching or similar characteristics denoted by the various shading configurations of the client devices 202. For example, the emerging user segment system 104 generates the emerging user segment 215 comprising users for each of the client devices 202 having a black, left-side semicircle that represents or indicates one or more matching user attributes. Moreover, the emerging user segment system 104 excludes from the emerging user segment 215 users for each of the client devices 202 that do not have a black, left-side semicircle.

Based on the emerging user segment 215, at act 216, the emerging user segment system 104 provides a segment visualization for display within a graphical user interface of a client device. The segment visualization can include one or more visual aids for representing and/or recommending the emerging user segment 215. In certain implementations, the segment visualization includes charts, statistics, or textual descriptions. Additionally or alternatively, the segment visualization includes a selectable option to add the emerging user segment 215 to one or more saved segments associated with a user account.

As mentioned above, the emerging user segment system 104 analyzes various inputs—including respondent attributes and a target outcome—to generate an emerging user segment. The emerging user segment system 104 can use a variety of ways to determine the respondent attributes and the target outcome. In certain implementations, the emerging user segment system 104 identifies user input indicating one or both of the target outcome or the respondent attributes. In other implementations, the emerging user segment system 104 identifies characteristics of an organization or industry to determine one or both of the target outcome or the respondent attributes. Still further, in some embodiments, the emerging user segment system 104 uses a schematization mapping.

Figure 3:
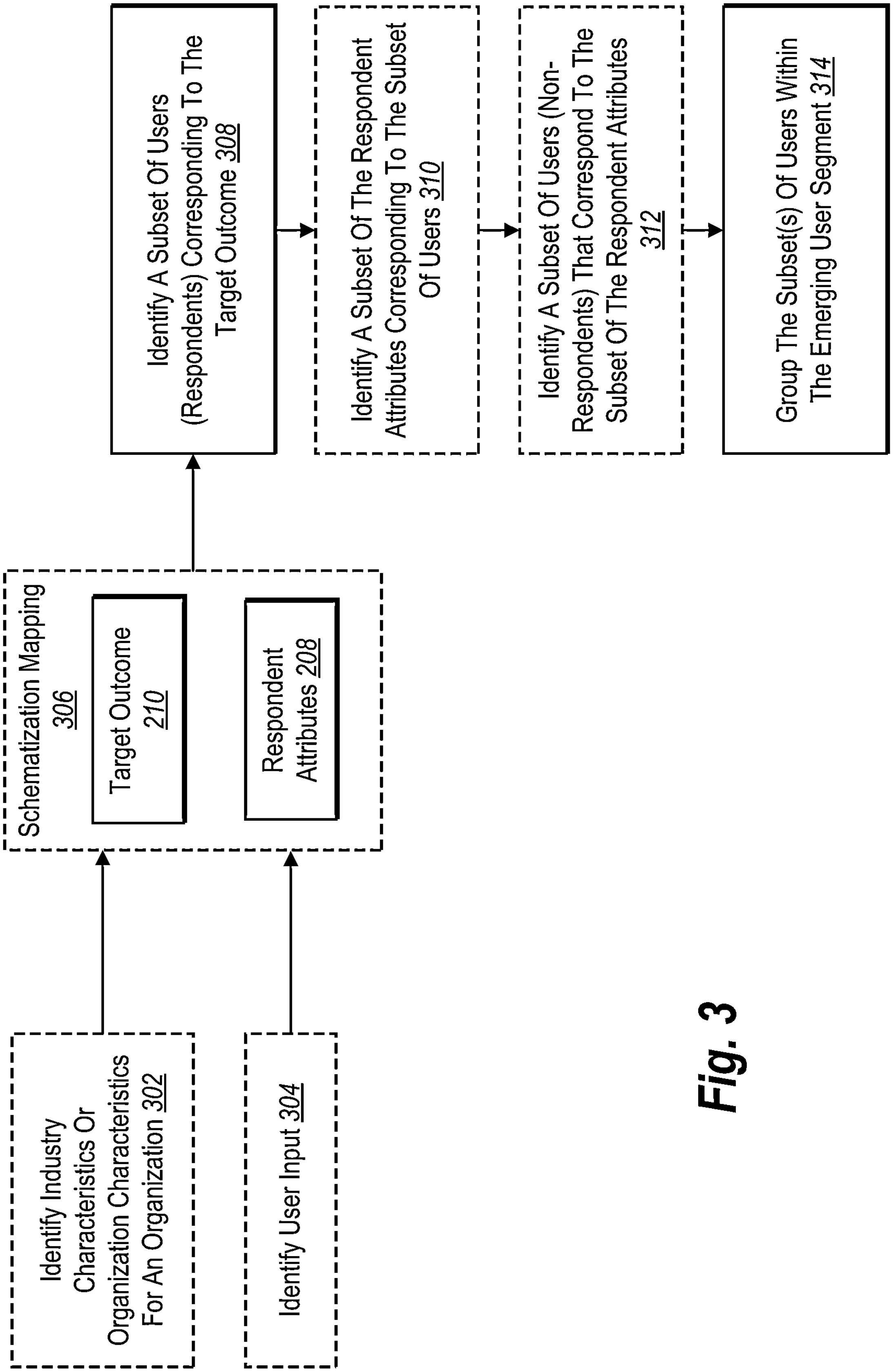
FIG. 3 illustrates an emerging user segment system grouping subsets of users within an emerging user segment in accordance with one or more embodiments.

FIG. 3 illustrates the emerging user segment system 104 grouping subsets of users within an emerging user segment in accordance with one or more embodiments. In particular, FIG. 3 depicts the emerging user segment system 104 utilizing user input to identify at least one of the target outcome 210 and/or the respondent attributes 208. However, less sophisticated users may be unable to provide such input, or the user input may be unnecessary. Accordingly, in some embodiments, the emerging user segment system 104 uses at least one of industry characteristics, organization characteristics, or a schematization mapping to determine the target outcome 210 and subsequently identify the respondent attributes 208 corresponding to the target outcome 210. Subsequently, the emerging user segment system 104 can identify subsets of users for grouping into an emerging user segment based on the target outcome 210 and the respondent attributes 208.

At an optional act 302, the emerging user segment system 104 identifies industry characteristics or organization characteristics for an organization to identify the target outcome 210 and/or the respondent attributes 208. In particular embodiments, the emerging user segment system 104 identifies the industry characteristics or organization characteristics for an organization by retrieving, mining, scraping, or requesting historical survey data, company-specific or industry-specific metrics, website information, publicly available records, public relation reports, journal articles, social media communications, etc. Accordingly, the act 302 may include using a variety of different data mining algorithms, application programming interfaces, etc.

Based on the industry characteristics or organization characteristics for the organization, the emerging user segment system 104 can identify the target outcome 210 by predicting candidate target outcomes. For example, the emerging user segment system 104 can predict candidate target outcomes by estimating values via statistical analyses of industry characteristics for other organizations or users across an industry of the organization (e.g., using regression analysis, standard deviation, extrapolation). To illustrate such an estimated value, the emerging user segment system 104 can determine churn-out rates at which users exit an organization by age, salary, and occupation across the healthcare industry. The emerging user segment system 104 can then use an average churn-out rate across an industry of the organization to predict a candidate target outcome comprising a probability that certain users will exit the organization.

After identifying candidate target outcomes, the emerging user segment system 104 can select the target outcome 210 utilizing heuristics. For example, the emerging user segment system 104 can determine the target outcome 210 by comparing one or more candidate target outcomes with one or more heuristic thresholds (e.g., a threshold user-exit-threshold probability). If a candidate target outcome satisfies the one or more heuristic thresholds, the emerging user segment system 104 can select the candidate target outcome for using as the target outcome 210.

Based on the target outcome 210, the emerging user segment system 104 can identify the respondent attributes 208 of respondents with survey responses corresponding to the target outcome 210. For instance, the emerging user segment system 104 can identify the respondent attributes 208 by identifying characteristics of respondents who have survey responses matching (or otherwise corresponding to) the target outcome 210. To illustrate one example, the emerging user segment system 104 may identify the respondent attributes 208 by identifying characteristics of each respondent that, according to the target outcome 210, indicates they would not recommend Product X to a friend.

Independent of the target outcome 210, the emerging user segment system 104 can instead utilize the industry characteristics or organization characteristics for the organization to identify the respondent attributes 208. For example, the emerging user segment system 104 can predict the respondent attributes 208 by analyzing characteristics of users across an industry or particular organization. To do so, in certain implementations, the emerging user segment system 104 utilizes a machine-learning model approach. For instance, the emerging user segment system 104 can use a gradient-based decision tree for identifying one or more respondent attributes that satisfy a deterministic threshold. To illustrate, the gradient-based decision tree can receive input characteristics and then filter or weight characteristics in a step-wise fashion to identify the deterministic characteristics.

Additionally or alternatively, the emerging user segment system 104 can use a neural network trained to predict the respondent attributes 208 based on characteristics of users across an industry or particular organization. For example, based on input characteristics obtained at the act 302, the emerging user segment system 104 neural network can determine or identify respondent attributes for respondents with classification scores or confidence levels that satisfy a deterministic threshold.

In other embodiments, the emerging user segment system 104 determines the respondent attributes 208 corresponding to or matching the target outcome 210 using one or more heuristic approaches. For example, the emerging user segment system 104 may use all characteristics of competitor organizations within the industry that have a comparable employee size (e.g., within a same 10% employee size range). As another example, the emerging user segment system 104 may include characteristics if related to certain policies (e.g., race, gender, and sexual orientation for diversity and inclusion).

As further shown in FIG. 3, at an optional act 304, the emerging user segment system 104 identifies user input for determining at least one of the target outcome 210 or the respondent attributes 208. In one or more embodiments, the emerging user segment system 104 requests, via a user interface prompt, user input from the client device to indicate one or both of the target outcome 210 and the respondent attributes 208. For example, the user interface prompt may request one or more alphanumeric inputs, file uploads, etc. to provide one or both of the target outcome 210 or the respondent attributes 208. Additionally or alternatively, the emerging user segment system 104 may provide one or more interactive user interface elements such that a user can initiate providing one or both of the target outcome 210 and the respondent attributes 208.

For example, in some embodiments, the emerging user segment system 104 identifies user input from a client device (e.g., an administrator device) that expressly specifies the target outcome 210. To illustrate, the emerging user segment system 104 may detect that the user input provides a range of customer satisfaction scores, user-exit-threshold probabilities (e.g., churn probabilities), etc. In certain implementations, the emerging user segment system 104 detects a variety of different user input data via a graphical user interface, a file upload, and/or an electronic communication. In particular embodiments, the user input data corresponds to digital selections, alphanumeric inputs, voice commands, keystrokes, haptic inputs, etc.

Additionally or alternatively, in certain embodiments, the emerging user segment system 104 identifies user input that provides guidance for generating the target outcome. In some embodiments, target outcome guidance comprises a coarse selection of a target outcome that the emerging user segment system 104 can use for predicting the target outcome 210. In other embodiments, the emerging user segment system 104 uses the coarse selection to identify the target outcome 210. For instance, the emerging user segment system 104 may utilize user input indicating coarse target outcome guidance for "customer satisfaction scores" to identify a specific digital survey, specific survey question(s), and/or specific survey responses that are relevant to "customer satisfaction scores" or other metrics. As another example, the emerging user segment system 104 may identify a user input indicating target outcome guidance of "dissatisfied customers." Based on the target outcome guidance of "dissatisfied customers," the emerging user segment system 104 can generate a target outcome of "dissatisfied customers who purchased product X from Store Y." In this manner, the emerging user segment system 104 can build off the target outcome guidance to determine a specific target outcome of interest.

Similarly, in some embodiments, the emerging user segment system 104 identifies user input to determine the respondent attributes 208. To illustrate, in one or more embodiments, the emerging user segment system 104 identifies user input from a client device that defines or details the respondent attributes 208. For instance, the emerging user segment system 104 can identify file uploads (e.g., user-generated lists), user interface selections, etc. as similarly described above.

As shown in FIG. 3, in some embodiments, the emerging user segment system 104 uses a schematization mapping 306 to determine at least one of the target outcome 210 or the respondent attributes 208. In one or more embodiments, the schematization mapping 306 defines input data (e.g., survey responses, industry or organization characteristics, user input) to the emerging user segment system 104 relative to one or more predefined fields. In this manner, the emerging user segment system 104 can more accurately and efficiently identify and use the input data.

For example, in some embodiments, the emerging user segment system 104 determines the target outcome 210 by using the schematization mapping 306 comprising mapping pairs that map predefined fields to user-provided target outcomes or target outcome guidance. In particular embodiments, the emerging user segment system 104 uses the schematization mapping 306 to convert or translate data (e.g., for providing to one or more machine-learning models). To illustrate, the schematization mapping 306 may map a user-input-field entry for a user-provided target outcome of "CSAT Score<2.75" to a predefined field of "Dissatisfied Customers With CSAT Scores Less than 2.75." Thus, according to the schematization mapping 306, the emerging user segment system 104 may use the target outcome of "Dissatisfied Customers With CSAT Scores Less than 2.75" as the target outcome 210.

As another example, the schematization mapping 306 comprises mapping pairs that map survey response data to predefined fields. For instance, the schematization mapping 306 maps candidate respondent attributes from survey response data to predefined fields. To illustrate, the emerging user segment system 104 maps a field for "B-day" in the survey response data to a field for "Date of Birth" within the schematization mapping 306. The emerging user segment system 104 can then use the "B-day" date provided in the survey response data as the "Date of Birth." For example, as described above, the emerging user segment system 104 can then accurately analyze "Date of Birth" and other candidate respondent attributes using a machine-learning model to predict which candidate respondent attributes satisfy a deterministic threshold. Additional or alternative details of the schematization mapping 306 are described in DETERMINING AND APPLYING ATTRIBUTE DEFINITIONS TO DIGITAL SURVEY DATA TO GENERATE SURVEY ANALYSES, U.S. patent application Ser. No. 16/928,897, filed on Jul. 14, 2020, the contents of which are expressly incorporated herein by reference.

As further shown in FIG. 3, at an act 308, the emerging user segment system 104 identifies a subset of users corresponding to the target outcome 210. In particular embodiments, the emerging user segment system 104 identifies a subset of users (e.g., respondents) that responded to a digital survey and meet one or more criteria specified in the target outcome 210. To illustrate, the emerging user segment system 104 may identify all users who responded to a digital survey and provided survey responses indicating CSAT scores less than 2.75 (e.g., according to a target outcome of "Dissatisfied Customers With CSAT Scores Less than 2.75").

After identifying a subset of respondents, at an optional act 310, the emerging user segment system 104 identifies a subset of the respondent attributes 208 corresponding to the subset of users (e.g., respondents) that responded to a digital survey and meet one or more criteria specified in the target outcome 210. For example, the emerging user segment system 104 may identify the attributes of the subset of users who responded to the digital survey and provided survey responses indicating CSAT scores less than 2.75. In particular, the emerging user segment system 104 may identify the subset of the respondent attributes 208 includes "divorced," "males," "over 60 years old," and "without health insurance."

In addition to identifying a subset of respondents, at an optional act 312, the emerging user segment system 104 identifies a subset of users (e.g., non-respondents) that correspond to the subset of the respondent attributes 208. In some cases, at the act 312, the emerging user segment system 104 identifies users that look like the subset of users (e.g., respondents) that meet one or more criteria specified in the target outcome 210. To identify this subset of users (e.g., non-respondents), the emerging user segment system 104 can implement a variety of different attribute-comparison approaches to compare the attributes of non-respondents with the subset of the respondent attributes 208 identified above at the act 310.

To illustrate, when performing the act 312, the emerging user segment system 104 uses one or more natural language processing algorithms to determine a semantic similarity between attributes of non-respondents and the subset of respondent attributes. For example, the emerging user segment system 104 compares attributes of non-respondents and the subset of respondent attributes using one or more of an edit distance algorithm (also referred to as the Levenshtein distance algorithm), cosine similarity, vectorization, bag of words, term frequency and inverse document frequency, text normalization, naïve Bayes algorithm, word embedding, long short-term memory, etc.

Based on the comparison, the emerging user segment system 104 can determine which attributes of non-respondents are the same or similar to (and therefore correspond to) the subset of the respondent attributes 208. For example, the emerging user segment system 104 can determine similarity scores for the attributes of non-respondents. Subsequently, the emerging user segment system 104 can compare the similarity scores to one or more similarity score thresholds to determine that one or more of the attributes of the non-respondents correspond to the subset of the respondent attributes 208. For instance, if a similarity score of an attribute of a non-respondent satisfies a threshold similarity score, the attribute corresponds to the subset of the respondent attributes 208. Otherwise, if a similarity score of an attribute of a non-respondent fails to satisfy a threshold similarity score, the attribute does not correspond to the subset of the respondent attributes 208.

In addition to using similarity scores, the emerging user segment system 104 can identify a subset of users (non-respondents) that have one or more of the attributes that correspond to the subset of the respondent attributes 208. For example, the emerging user segment system 104 can identify the subset of users by locating each client device identifier, user account identifier, etc. associated with non-respondents that have one or more of the attributes that are the same as or that correspond to the subset of the respondent attributes 208.

As further shown in FIG. 3, at an act 314, the emerging user segment system 104 groups the subset(s) of users within the emerging user segment. In some embodiments, the emerging user segment system 104 generates the emerging user segment by grouping a first subset of users within the emerging user segment comprising only respondents that correspond to the subset of the respondent attributes 208. In other embodiments, the emerging user segment system 104 generates the emerging user segment by grouping a second subset of users within the emerging user segment comprising only non-respondents that correspond to the subset of the respondent attributes 208. Still further, in certain embodiments, the emerging user segment system 104 generates the emerging user segment by grouping a combination of the first and second subsets of users (e.g., respondents and non-respondents) that correspond to the subset of the respondent attributes 208.

It can be appreciated that the acts and algorithms described above in relation to FIG. 3 may be modified in accordance with one or more embodiments of the presents disclosure. For example, in certain implementations, the emerging user segment system 104 generates an emerging user segment based on the target outcome 210 and attributes of users—independent of digital surveys or survey responses.

For instance, instead of the respondent attributes 208, the emerging user segment system 104 can similarly determine attributes for a different set of users (e.g., employee attributes determined without survey responses for currently employed users at an organization). Accordingly, at the act 310, the emerging user segment system 104 can identify a subset of the employee attributes corresponding to a subset of users (e.g., employees) that meet one or more criteria specified in the target outcome 210. Subsequently, at the act 312, the emerging user segment system 104 can identify a subset of users (e.g., prospective employees) that correspond to the subset of the employee attributes. The emerging user segment system 104 can then group the prospective employees within the emerging user segment (e.g., to recommend prospective employees to an organization).

Although not illustrated in FIG. 3, the emerging user segment system 104 can generate and/or convert the emerging user segment in a variety of different formats. For instance, the emerging user segment system 104 may generate the emerging user segment in language-independent data formats, such as JavaScript Object Notation. In other instances, the emerging user segment system 104 may generate the emerging user segment in language-specific data formats.

Figure 4A:
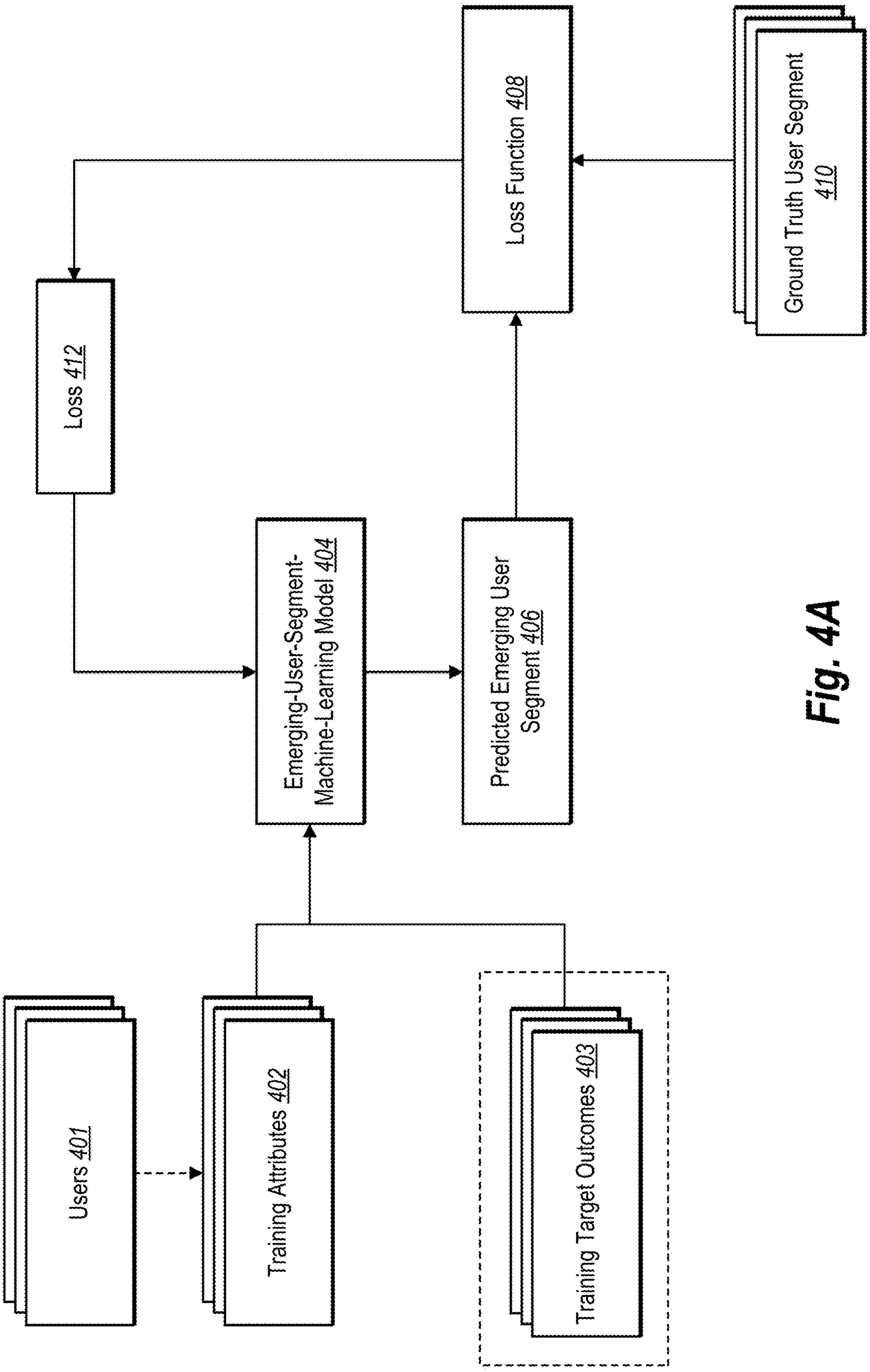
FIG. 4A illustrates an emerging user segment system training an emerging-user-segment-machine-learning model to generate predicted emerging user segments in accordance with one or more embodiments.

As mentioned above, the emerging user segment system 104 can intelligently identify or predict emerging user segments based on target outcomes and corresponding respondent attributes. FIG. 4A illustrates the emerging user segment system 104 training an emerging-user-segment-machine-learning model 404 to generate predicted emerging user segments in accordance with one or more embodiments. In particular, FIG. 4A shows the emerging-user-segment-machine-learning model 404 determining a predicted emerging user segment 406 for users based on training attributes 402 corresponding to training target outcomes 403. Subsequently, the emerging-user-segment-machine-learning model 404 compares the predicted emerging user segment 406 to a ground truth user segment 410 to determine a loss 412 and update parameters of the emerging-user-segment-machine-learning model 404 to improve subsequent predictions.

As shown in FIG. 4A, the emerging user segment system 104 identifies training target outcomes 403. In one or more embodiments, the training target outcomes 403 comprise various types of target outcomes and/or target outcome guidance. For example, the training target outcomes 403 may include coarse target outcome guidance in the form of actual administrator inputs hinting or suggesting important concepts of interest (e.g., low customer satisfaction scores, potential churn-out of employees). Additionally or alternatively, the training target outcomes 403 may include a list of one or more digital surveys, survey questions, and/or survey responses of interest, target changes or thresholds for revenue (e.g., a percentage or amount of change or threshold in customer revenue over a time period), or target changes or thresholds for usage (e.g., an amount of time or number of queries over a time period).

As further shown in FIG. 4A, the emerging user segment system 104 inputs training attributes 402 for users 401 into the emerging-user-segment-machine-learning model 404. In some embodiments, the emerging user segment system 104 determines the training attributes 402 based on the training target outcomes 403. For example, the emerging user segment system 104 identifies the characteristics of each user from the users 401 that align or comport with the training target outcomes 403. To illustrate, in some embodiments, the emerging user segment system 104 identifies the characteristics of each user from the users 401 that responded to a specific digital survey or indicated a particular response that the training target outcomes 403 indicate are important or relevant.

In one or more embodiments, the training attributes 402 comprise a variety of different attributes or characteristics, regardless of the training target outcomes 403. For example, the training attributes 402 may include the characteristics of both users that responded to a digital survey and users that did not respond to the digital survey. Additionally, for example, the training attributes 402 may include employee attributes, the attributes of users across an organization, the attributes of users across an industry, etc. As shown in FIG. 4A, in particular embodiments, the training attributes 402 comprise training labels that correspond to the attributes of users associated with the ground truth user segment 410.

Based on the training attributes 402 and optionally the training target outcomes 403, the emerging-user-segment-machine-learning model 404 generates the predicted emerging user segment 406. A variety of machine-learning models can perform this act. For example, the emerging-user-segment-machine-learning model 404 can include one or more of a decision tree (e.g., a gradient boosted decision tree), a linear regression model, a logistic regression model, association rule learning, inductive logic programming, support vector learning, a Bayesian network, a regression-based model, principal component analysis, a clustering model, a neural network, or a combination thereof.

To illustrate an example implementation, in some embodiments, the emerging-user-segment-machine-learning model 404 includes a regression model (e.g., linear, multiple linear, or non-linear) that processes respondent attributes for users that indicated a threshold sentiment score as specified in a survey response. In processing the respondent attributes, the regression model can estimate numerical relationships between specific respondent attributes (dependent variables) and the threshold sentiment score (the independent variable). Using the estimated numerical relationships, the regression model can predict one or more combinations of respondent attributes that are indicative of corresponding users having the threshold sentiment score. Subsequently, the emerging user segment system 104 can generate the predicted emerging user segment 406 that corresponds to the threshold sentiment score by identifying and grouping users from the users 401 that correspond to the predicted combination(s) of respondent attributes.

In one or more embodiments, the predicted emerging user segment 406 comprises one or more subsets of users that satisfy certain attributes and a target outcome. For example, the predicted emerging user segment 406 may include respondents and/or non-respondents that satisfy (e.g., match or are similar to) the input criteria of one or more of the training attributes 402 and/or the training target outcomes 403. To illustrate, the predicted emerging user segment 406 may include all users at risk of exiting an organization.

Further, in certain implementations, the predicted emerging user segment 406 includes one or more classification scores for each user of the users 401 grouped within the predicted emerging user segment 406. Specifically, in some embodiments, the emerging-user-segment-machine-learning model 404 groups users of the users 401 within the predicted emerging user segment 406 based on corresponding classification scores satisfying a threshold classification score. In some embodiments, the emerging user segment system 104 uses the classification score for a given user from the users 401 to provide a user-specific statistical confidence level that the user belongs in the predicted emerging user segment 406. Additionally or alternatively, the emerging user segment system 104 uses a combination of classification scores for multiple users of the users 401 within the predicted emerging user segment 406 to provide a segment-specific statistical confidence level that the predicted emerging user segment 406 is accurate or probable.

After determining the predicted emerging user segment 406 for a user, the emerging user segment system 104 compares the predicted emerging user segment 406 and the ground truth user segment 410 utilizing a loss function 408. In particular embodiments, the ground truth user segment 410 corresponds to an actual user segment, a verified user segment, or a historical user segment previously determined as accurate, optimal, or preferred. Based on this comparison using the loss function 408, the emerging user segment system 104 generates a loss 412.

Examples of the loss function 408 can include a regression loss function (e.g., a mean square error function, a quadratic loss function, an L2 loss function, a mean absolute error/L1 loss function, mean bias error, etc.). Additionally or alternatively, the loss function 408 can include a classification loss function (e.g., a hinge loss/multi-class SVM loss function, cross entropy loss/negative log likelihood function, etc.). In certain instances, the loss function 408 includes the Gini Index. Further, the loss function 408 can return the loss 412 comprising quantifiable data regarding the difference between the predicted emerging user segment 406 and the ground truth user segment 410. In particular, the loss function 408 can return the loss 412 to emerging-user-segment-machine-learning model 404 where the emerging user segment system 104 can adjust various parameters/weights to improve the quality/accuracy of the predicted emerging user segment 406 by reducing the loss (e.g., via backpropagation).

As suggested by FIG. 4A, the training/learning of the emerging-user-segment-machine-learning model 404 can be an iterative process. Indeed, the emerging user segment system 104 can continually adjust parameters/hyperparameters of the emerging-user-segment-machine-learning model 404 over learning cycles, as shown by the return arrow between the loss function 408 and the emerging-user-segment-machine-learning model 404.

Figure 4B:
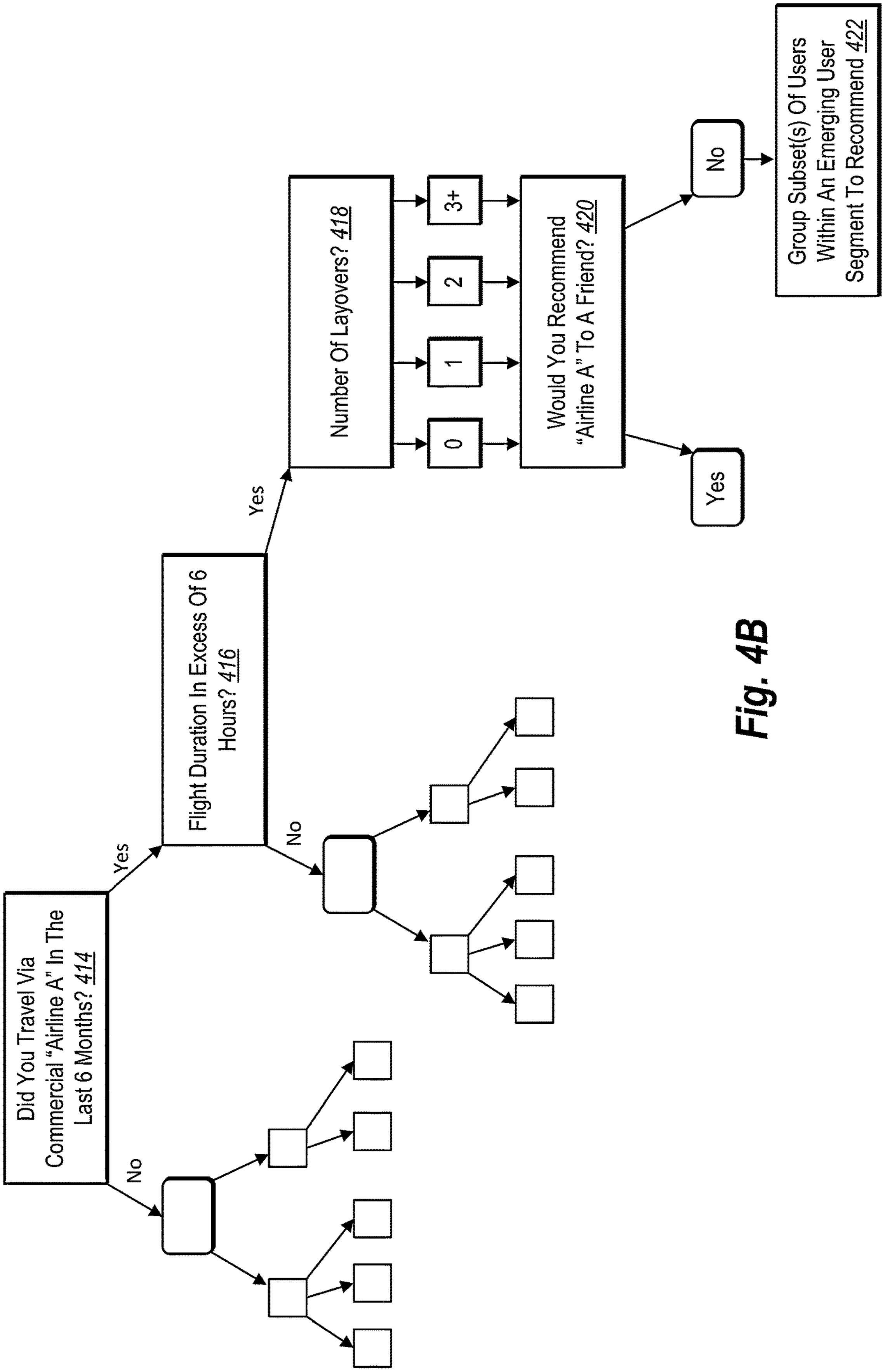
FIG. 4B illustrates an emerging user segment system implementing a trained decision tree machine-learning model to generate an emerging user segment in accordance with one or more embodiments.

As suggested above, the emerging user segment system 104 can utilize myriad other training processes to train the emerging-user-segment-machine-learning model 404. For example, in some embodiments, the emerging-user-segment-machine-learning model 404 comprises a decision tree tuned to generate an emerging user segment through a step-wise process at each node. In accordance with one or more such embodiments, FIG. 4B illustrates the emerging user segment system 104 implementing a trained decision tree machine-learning model to generate an emerging user segment. Specifically, FIG. 4B shows the decision tree is trained based on respondent attributes of flying with commercial "Airline A" in the last six months, a flight duration greater than six hours, and "X" number of layovers. In particular embodiments, the emerging user segment system 104 has tuned the decision tree to account for these deterministic respondent attributes. In addition, FIG. 4B shows the decision tree is trained based on a target outcome of users that would not recommend "Airline A" to a friend.

For example, at node 414, the decision tree identifies users that affirmatively indicated travel via commercial "Airline A" within the past six months. For users the that did not indicate travel via commercial "Airline A" within the past six months, the decision tree can include one or more additional nodes and branches (e.g., denoted by the blank boxes and corresponding arrows). However, the decision tree can ignore or discount (e.g., weight to zero) survey responses indicating no travel via commercial "Airline A" in the last six months. Similarly, at node 416, the decision tree identifies users that indicated experiencing a flight duration in excess of six hours. As done for the node 414, the decision tree can similarly ignore or discount (e.g., weight to zero) survey responses indicating a flight duration of six hours or less.

As further shown in FIG. 4B, at node 418, the decision tree identifies particular subsets of users that indicated a respective number of layovers ranging from zero to three or more. Further, at node 420, the decision tree identifies one or more subsets of users that would not recommend "Airline A" to a friend.

At an act 422, the decision tree can group subset(s) of users within an emerging user segment to recommend (e.g., to one or more client devices). For example, based on the identified users at each successive node, the decision tree can progressively narrow the number of users (e.g., respondents) based on specific respondent attributes and a target outcome to determine a final subset of users for including in the emerging user segment.

As further shown in FIG. 4B, at the act 422, the emerging user segment system 104 can also identify non-respondents that should likely be added to the emerging user segment. For example, as described above in relation to FIG. 3, the emerging user segment system 104 can subsequently identify non-respondents that, although did not provide a survey response, have the same attributes as the respondent attributes for the final subset of users that would not recommend "Airline A" to a friend. That is, the emerging user segment system 104 can identify non-respondents that also flew with commercial "Airline A" in the last six months, were on flight(s) for longer than six hours, and had "X" number of layovers between an originating airport and a destination airport. In turn, the emerging user segment system 104 can group this look-alike subset of non-respondents within the emerging user segment.

As mentioned above, the emerging user segment system 104 can perform a variety of digital actions based on an emerging user segment. For example, the emerging user segment system 104 can transmit an electronic communication, generate/send a digital survey, update segment characteristics of the emerging user segment, or generate a digital ticket. In accordance with one or more such embodiments, FIG. 5 illustrates the emerging user segment system 104 utilizing an emerging user segment to perform a digital action.

Figure 5:
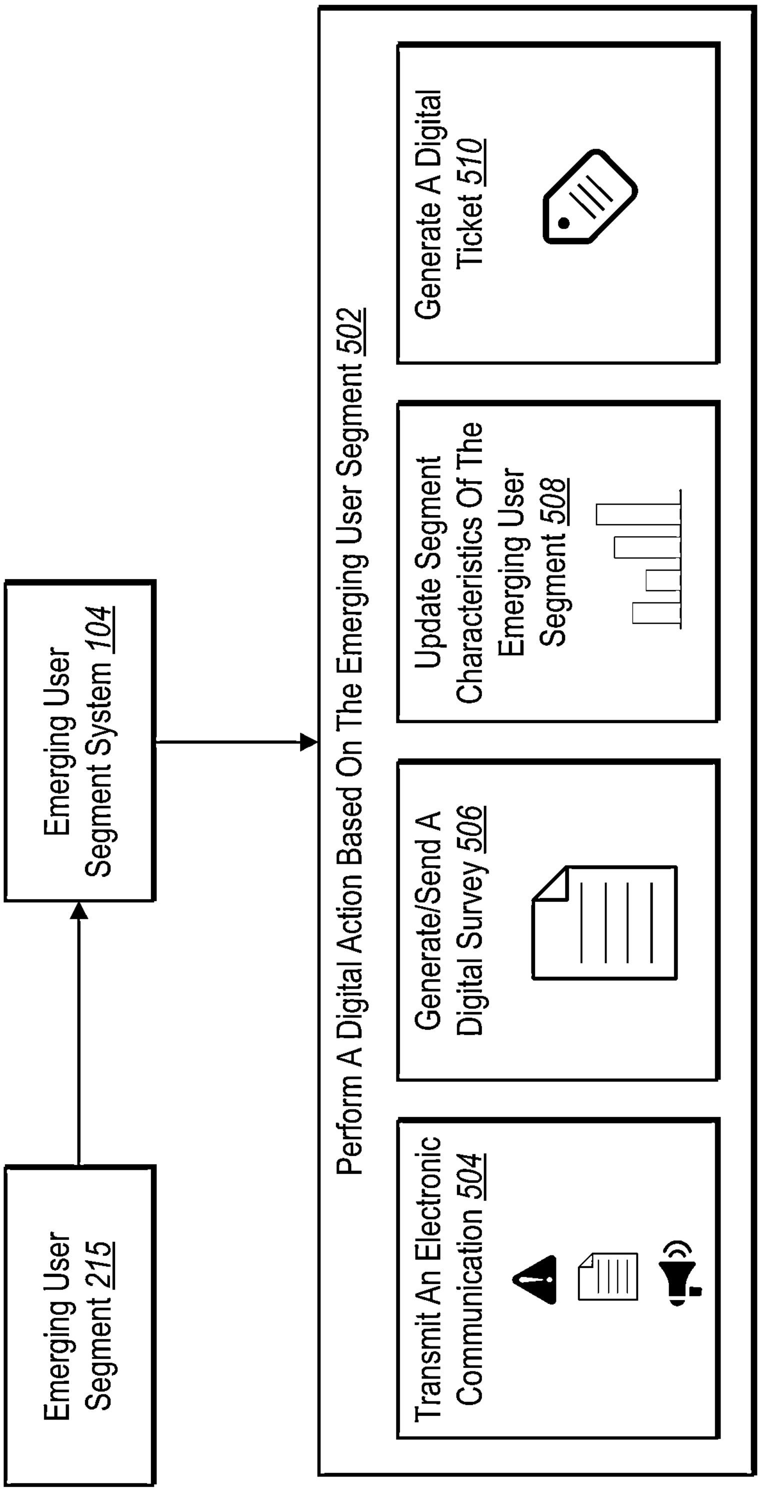
FIG. 5 illustrates an emerging user segment system utilizing an emerging user segment to perform a digital action in accordance with one or more embodiments.

As shown at an act 502 in FIG. 5, the emerging user segment system 104 performs a digital action based on the emerging user segment 215. For example, the emerging user segment system 104 performs a digital action 504 by transmitting an electronic communication based on the emerging user segment 215. To illustrate the digital action 504, the emerging user segment system 104 can transmit, to a client device, an electronic communication comprising one or more of an SMS message, instant message, e-mail, social media post, etc. In some embodiments, the electronic communication provides a recommendation of the emerging user segment 215. In other embodiments, the electronic communication provides a warning notification or alert (e.g., that the emerging user segment 215 is growing larger or smaller). Still, in other embodiments, the electronic communication can include targeted digital content (e.g., promotions, coupons, awards) for users of the emerging user segment 215.

As a further example of a digital action, in some embodiments, the emerging user segment system 104 performs a digital action 506 by generating or sending a digital survey specific to the emerging user segment 215. For example, the emerging user segment system 104 may auto-populate certain survey questions and response choices. Additionally or alternatively, the emerging user segment system 104 may recommend including certain survey questions and response choices based on a particular aspect or user composition of the emerging user segment 215. For instance, the emerging user segment system 104 may recommend sending a follow-up survey to one or more user devices associated with the emerging user segment 215. The follow-up survey may include survey questions that inquire what left the user dissatisfied or what the user would like to have experienced differently. Based on the digital survey generated, the emerging user segment system 104 can automatically (or upon approval) send the digital survey to one or more users of the emerging user segment 215.

As yet another example of a digital action, in certain cases, the emerging user segment system 104 performs a digital action 508 by updating segment characteristics of the emerging user segment 215. For example, the emerging user segment system 104 may dynamically update a segment size, customer satisfaction score, lifetime value, or other metric associated with the emerging user segment 215. In certain implementations, the emerging user segment system 104 performs the digital action 508 at predetermined intervals or on a rolling basis (e.g., at or near real time in response to detecting changes to the segment characteristics). Moreover, as described more below in relation to FIG. 6A, the emerging user segment system 104 can present segment characteristics (e.g., updated segment characteristics) for the emerging user segment 215 as part of a segment visualization.

As further shown in FIG. 5, in one or more implementations, the emerging user segment system 104 performs a digital action 510 by generating a digital ticket based on the emerging user segment 215. In particular embodiments, the digital ticket indicates and tracks one or more tasks to be performed in relation to the emerging user segment 215. For example, the digital ticket may include one or more tasks assigned to a client device of a user associated with technical support, customer support, customer retention, etc. Moreover, in some embodiments, the emerging user segment system 104 autogenerates and transmits the digital ticket to the assigned client device(s) and/or an administrator device. Additionally, via a client device, the emerging user segment system 104 can identify user interactions to indicate progress and/or fulfillment of one or more tasks.

In particular embodiments, the emerging user segment system 104 uses a heuristics-based approach to identify specific tasks and/or task assignments for client devices. For example, the heuristics may include a specific set of predetermined tasks for a predetermined set of users depending on the type of emerging user segment. For example, if the emerging user segment corresponds to users at risk of churning out, the emerging user segment system 104 may autogenerate a digital ticket with tasks for client devices of users in a customer retention department or a human resources department. As another example, if the emerging user segment corresponds to users experiencing long call-wait times, the emerging user segment system 104 may autogenerate a digital ticket with tasks for client devices in a technical support department to increase system bandwidth.

In some embodiments, additional or alternative digital actions may apply. For example, in certain implementations, the emerging user segment system 104 performs a digital action comprising cross-customer dataset analysis. In this example, the emerging user segment system 104 compares the emerging user segment 215 to other pools of customers (e.g., within an industry) to obtain insights regarding the other pools of customers.

As discussed above, in some embodiments, the emerging user segment system 104 generates a segment visualization for presentation within a graphical user interface. FIGS. 6A-6D illustrate the emerging user segment system 104 providing user interfaces 602*a*-602*d* on a computing device 600 depicting segment visualizations in accordance with one or more embodiments. In these or other embodiments, the computing device 600 comprises a client application (e.g., one of the client applications 108*a*-108*n*). In some embodiments, the client application comprises computer-executable instructions that (upon execution) cause the computing device 600 to perform certain actions depicted in the figure, such as presenting a graphical user interface of the client application. Rather than refer to the client application or the emerging user segment system 104 as performing the actions depicted in the figure below, this disclosure will generally refer to the computing device 600 performing such actions for simplicity.

Figure 6A:
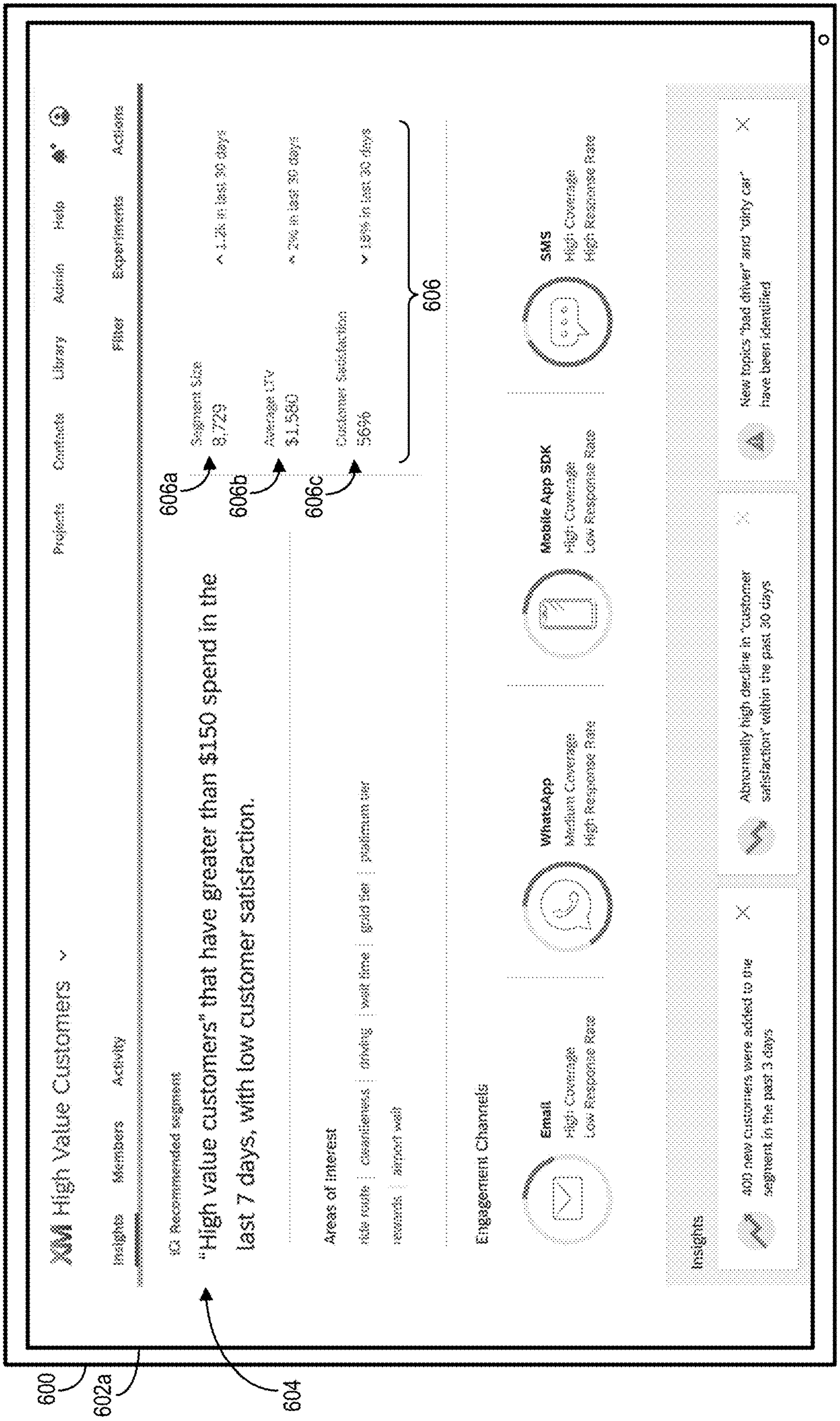
FIGS. 6A-6D illustrate an emerging user segment system providing graphical user interfaces on a computing device depicting segment visualizations in accordance with one or more embodiments.

As shown in FIG. 6A, the computing device 600 presents the user interface 602*a* comprising a segment visualization composed of a textual description 604 and segment characteristics 606 for an emerging user segment generated as described above in relation to the foregoing figures. In particular embodiments, the textual description 604 includes a textual explanation of the scope of the emerging user segment. For instance, as depicted in FIG. 6A, the textual description 604 comprises "'High value customers' that have greater than $150 spend in the last 7 days, with low customer satisfaction."

To generate the textual description 604, the computing device 600 can utilize a variety of different approaches. In certain implementations, the computing device 600 generates one or more elements of the textual description 604 based on a subset of the respondent attributes that correspond to a target outcome. Additionally or alternatively, the computing device 600 generates one or more elements of the textual description 604 utilizing a schematization mapping (e.g., the schematization mapping 306). For instance, the computing device 600 may generate the textual description 604 using client-specific terms captured in the schematization mapping to provide a more effective, persuasive segment visualization segment with terms familiar to the user.

As further shown in FIG. 6A, the segment characteristics 606 comprise certain statistical metrics related to characteristics of the emerging user segment. Specifically, the segment characteristics 606 comprises a segment size 606*a* of the emerging user segment with a corresponding amount that the segment size 606*a* has recently changed (e.g., an increase of 1.2k users in the last 30 days). Further, the segment characteristics 606 comprise a value metric 606*b* of the emerging user segment and a corresponding amount that the value metric 606*b* has recently changed (e.g., an increase of 2% in the last 30 days). In certain implementations, the value metric 606*b* represents a long-term value of the emerging user segment in terms of profit, revenue, etc. In addition, the segment characteristics 606 comprise a customer satisfaction metric 606*c* of the emerging user segment and a corresponding amount that the customer satisfaction metric 606*c* has recently changed (e.g., a decrease of 18% in the last 30 days).

In addition or in the alternative to the metrics shown in FIG. 6A, myriad other statistical metrics, indicators, and/or visuals may be shown in the segment characteristics 606. For example, in some embodiments, the segment characteristics 606 comprises a statistical confidence level that indicates a level of certainty of the emerging user segment. As another example, the segment characteristics 606 can include an abbreviated list of client identifiers, user accounts, user names, etc. that compose the emerging user segment (e.g., as shown in FIG. 6D). In certain implementations, the abbreviated list is interactive (e.g., to expand upon interaction). Additionally or alternatively, the computing device 600 may display specific data corresponding to the user included in the emerging user segment (e.g., user attributes, survey responses).

In one or more embodiments, the emerging user segment system 104 generates the segment characteristics 606 for display on the computing device 600 in a variety of ways. In some embodiments, the emerging user segment system 104 generates the segment characteristics 606 as a predetermined list of characteristics to compute (e.g., by analyzing the emerging user segment). In other embodiments, the emerging user segment system 104 comprises a dynamic list of characteristics to determine. For example, the emerging user segment system 104 may generate different types of segment characteristics for the segment characteristics 606 depending on the unique traits of the emerging user segment. For instance, instead of generating the value metric 606*b*, the emerging user segment system 104 may generate an age metric or other indicator for display on the computing device 600. Accordingly, in one or more embodiments, the segment characteristics 606 comprise trait metrics that make the emerging user segment an outlier user segment, a segment that differs from other saved segments, or a segment that warrants particular attention.

Further, in certain implementations, the computing device 600 uses the segment characteristics 606 to determine whether or not to surface a segment visualization or even generate the emerging user segment. For example, if the segment size 606*a* is too large (e.g., above some threshold segment size, such as 90% of a set of users), the computing device 600 may remove from display, delete from memory, and/or modify the emerging user segment. Similarly, if the value metric 606*b* is too low (e.g., below some threshold segment size, such as 1.0% of a set of users), the computing device 600 may remove from display, delete from memory, and/or modify the emerging user segment.

Figure 6B:
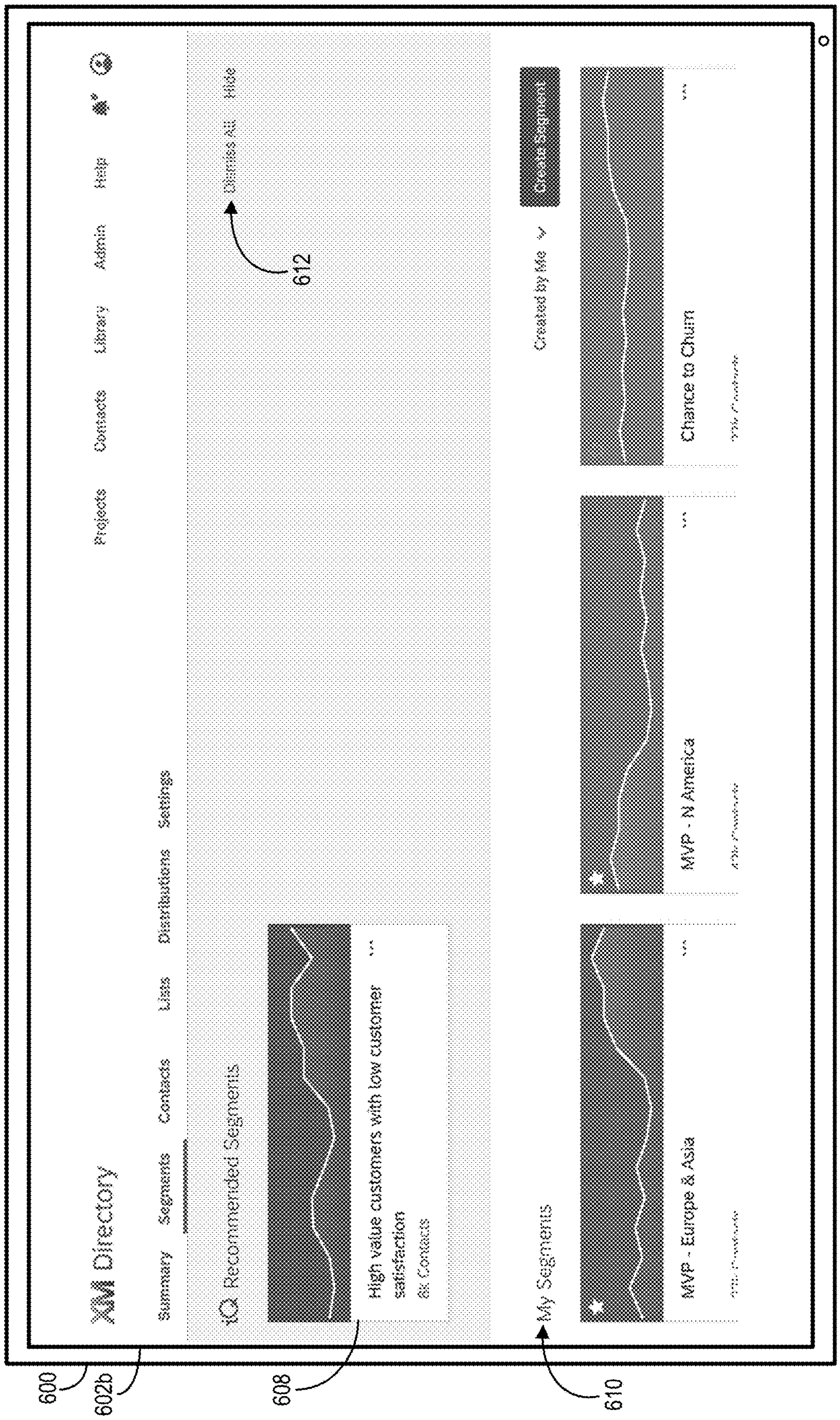

As shown in FIG. 6B, the computing device 600 presents the user interface 602*b* comprising a segment visualization 608. The segment visualization 608 comprises an abbreviated version of the segment visualization shown in FIG. 6A. Moreover, in some embodiments, the segment visualization 608 is interactive graphical element such that, upon detecting a selection of the segment visualization 608, the computing device 600 performs one or more corresponding acts. For example, in some embodiments, the computing device 600 adds the emerging user segment for display within saved segments 610 upon detecting a selection of the segment visualization 608. As an additional example, the computing device 600 changes how the emerging user segment corresponding to the segment visualization 608 is stored on one or more memory devices. For instance, upon detecting a selection of the segment visualization 608, the computing device 600 relocates an emerging user segment from a memory partition for temporary storage to another memory partition for long-term storage.

Alternatively, in response to user interaction with the dismissal link 612, the computing device 600 can perform a variety of acts in relation to displaying the segment visualization 608 and/or storing the corresponding emerging user segment in one or more memory devices. For example, in response to user interaction with the dismissal link 612, the emerging user segment system 104 may remove the segment visualization 608. To illustrate, in some implementations, the computing device 600 removes the segment visualization 608 by hiding the segment visualization 608 from display upon detecting a user interaction with the dismissal link 612. Additionally, in certain implementations, the computing device 600 removes the segment visualization 608 by deleting the emerging user segment associated with the segment visualization 608 from one or more memory devices upon detecting a user interaction with the dismissal link 612. In other implementations, the computing device 600 can change how the emerging user segment is stored on one or more memory devices upon detecting a user interaction with the dismissal link 612. For instance, the computing device 600 may modify a digital tag or initiate a timer to delete the emerging user segment within a threshold number of days.

Figure 6C:
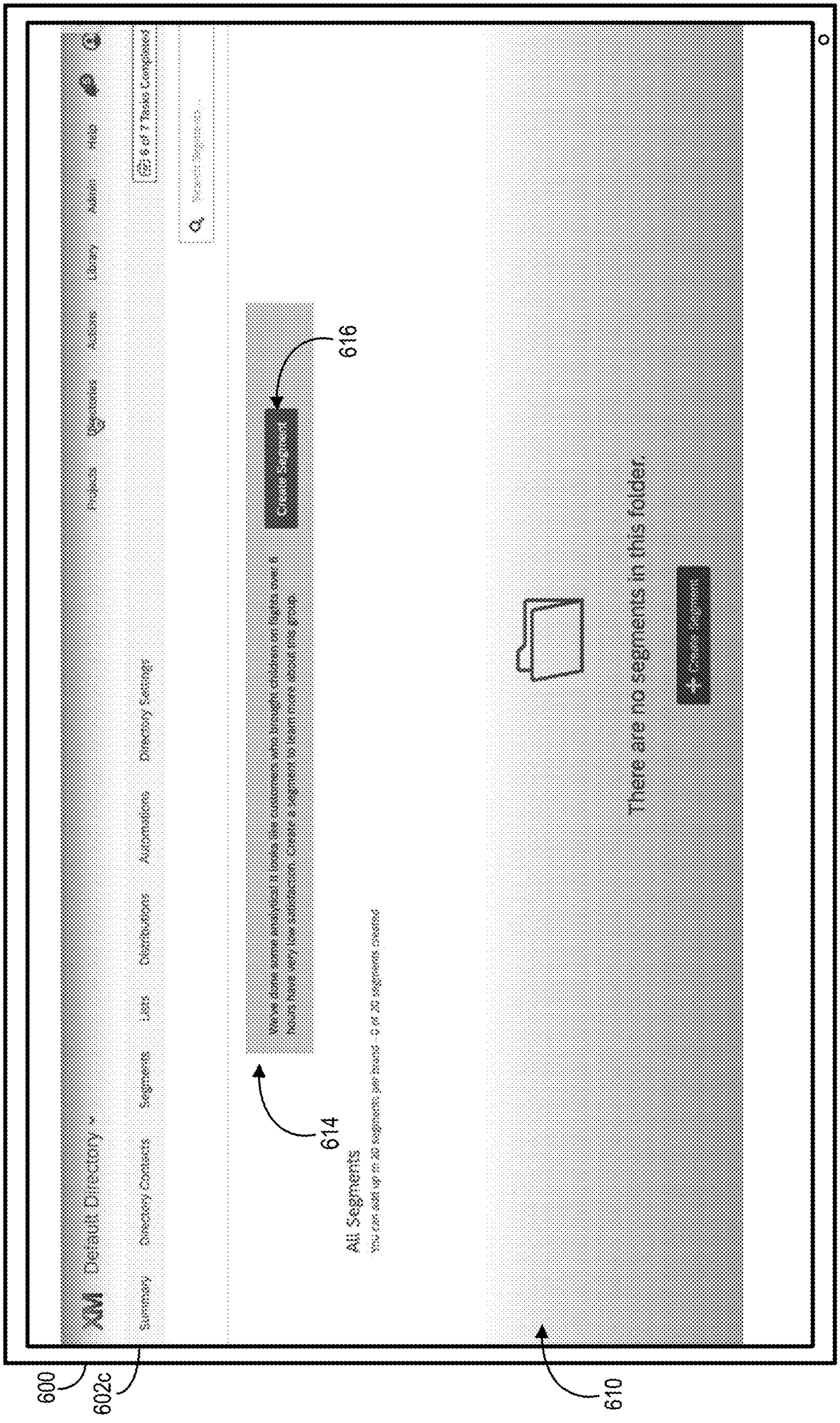
Figure 6D:
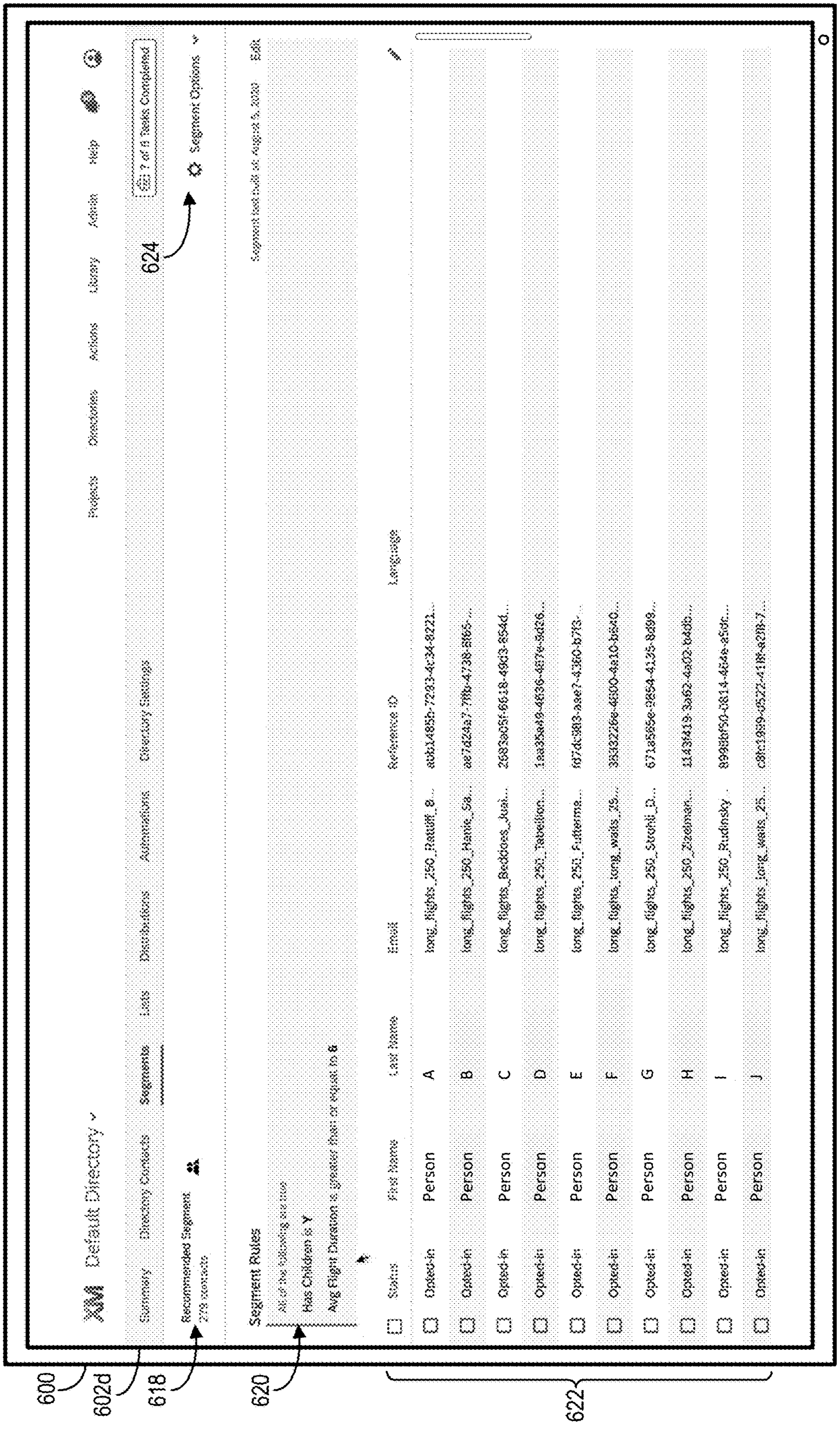

As shown in FIG. 6C, the computing device 600 presents the user interface 602*c* comprises a segment visualization 614 in a different format than the segment visualization 608 shown in FIG. 6B. The segment visualization 614 comprises a textual description of an emerging user segment in addition to a selectable add option 616. In response to user interaction with the selectable add option 616, the computing device 600 can add the emerging user segment to the saved segments 610.

Finally, as shown in FIG. 6D, the computing device 600 presents the individual users that comprise the emerging user segment for display within the user interface 602*d*. Specifically, the user interface 602*d* comprises a composition of an emerging user segment 618. For example, the user interface 602*d* comprises user attributes 620 that correspond to the emerging user segment 618 (e.g., "has children" and "flight duration is greater than or equal to 6"), and a user list 622 of each user in the emerging user segment 618 that satisfies the user attributes 620.

The user list 622 can take a variety of different forms, including myriad different data columns to identify particular users. As shown in FIG. 6D, the user list 622 comprises specific data columns of status (e.g., opt-in versus opt-out of a survey), first name, last name, email address, reference ID (e.g., a user identifier or a survey response identifier), and language. Additionally or alternatively, in certain implementations, the data columns can include specific survey responses (e.g., that correspond to key survey questions associated with a target outcome).

As further shown in FIG. 6D, the user interface 602*d* includes a segment-options menu 624. In response to a user interaction with the segment-options menu 624, the computing device 600 opens the segment-options menu 624 to display a variety of different customization settings, default settings, parameters, filter options, sorting options, display options, etc. for the emerging user segment 618.

Figure 7:
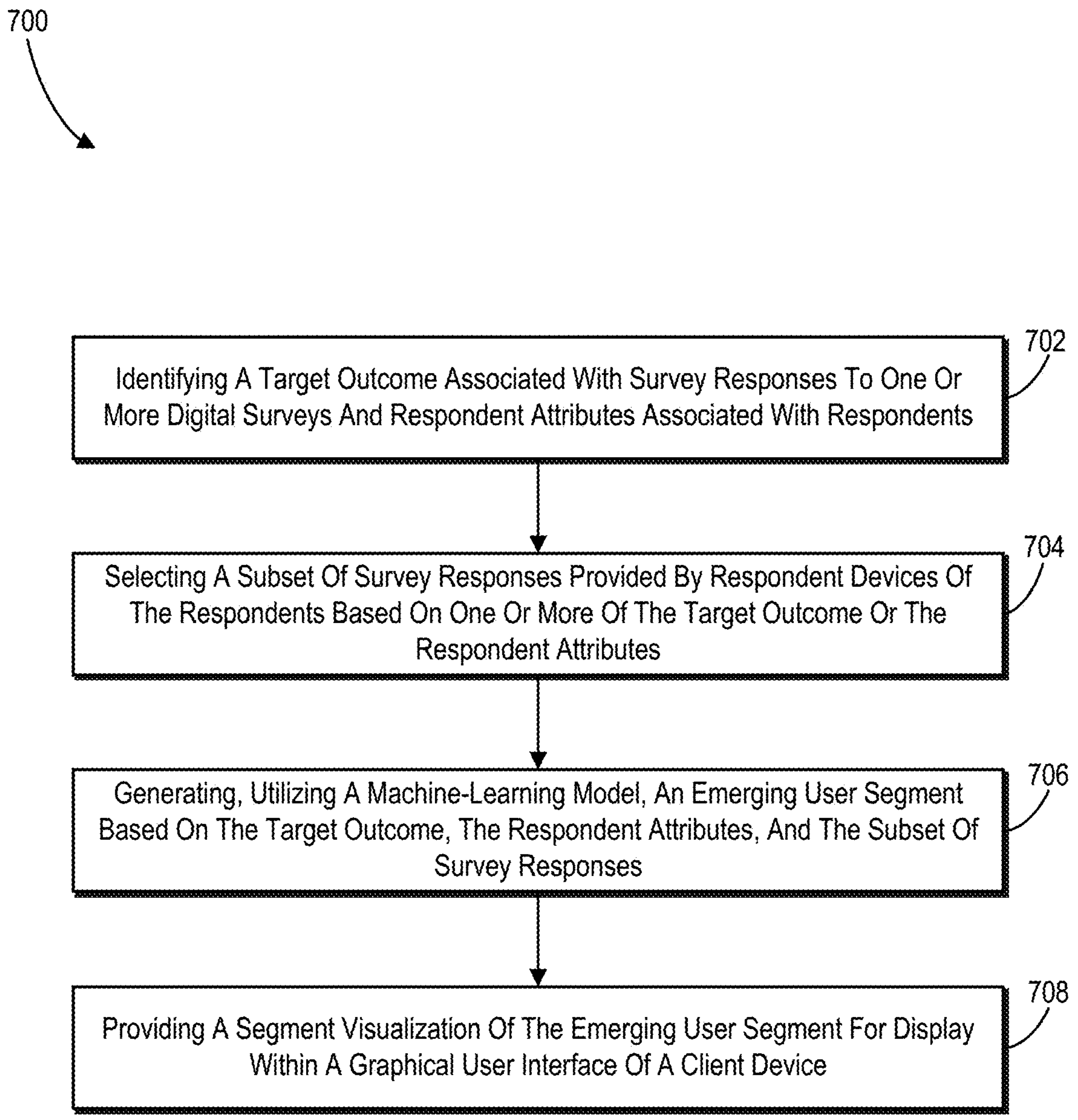
FIG. 7 illustrates a flowchart of a series of acts for utilizing a machine-learning model to generate an emerging user segment in accordance with one or more embodiments.

FIGS. 1-6D, the corresponding text, and the examples provide several different systems, methods, techniques, components, and/or devices of the emerging user segment system 104 in accordance with one or more embodiments. In addition to the above description, one or more embodiments can also be described in terms of flowcharts including acts for accomplishing a particular result. For example, FIG. 7 illustrates a flowchart of a series of acts 700 for generating an emerging user segment in accordance with one or more embodiments. The emerging user segment system 104 may perform one or more acts of the series of acts 700 in addition to or alternatively to one or more acts described in conjunction with other figures. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown, the series of acts 700 includes an act 702 of identifying a target outcome associated with survey responses to one or more digital surveys and respondent attributes associated with respondents. In some embodiments, identifying at least one of the target outcome or the respondent attributes is based on user input from one or more client devices. Additionally or alternatively, in certain implementations, identifying at least one of the target outcome or the respondent attributes is based on industry characteristics or organization characteristics corresponding to an organization associated with the one or more digital surveys. In certain implementations, identifying the target outcome comprises identifying at least one of a range of customer satisfaction scores in response to the one or more digital surveys or a chance that users exit an organization. For example, identifying the target outcome comprises identifying one or more customer satisfaction scores in response to the one or more digital surveys based on a customer-satisfaction-score threshold. As another example, identifying the target outcome comprises identifying a probability that users exit an organization based on a user-exit-threshold probability.

In addition, the series of acts 700 comprises an act 704 of selecting a subset of survey responses provided by respondent devices of the respondents based on one or more of the target outcome or the respondent attributes. In some embodiments, selecting the subset of survey responses comprises selecting survey responses that satisfy both the target outcome and at least one respondent attribute.

Further, the series of acts 700 includes an act 706 of generating, utilizing a machine-learning model, an emerging user segment based on the target outcome, the respondent attributes, and the subset of survey responses. In some embodiments, generating the emerging user segment comprising a subset of users that have not responded to the one or more digital surveys comprises: identifying a subset of the respondent attributes corresponding to the target outcome based on the subset of survey responses; identifying (e.g., utilizing a machine-learning model) that the subset of users that have not responded to the one or more digital surveys correspond to (e.g., are similar to) the subset of the respondent attributes; and grouping (e.g., utilizing a machine-learning model) the subset of users within the emerging user segment.

In addition, the series of acts 700 further includes an act 708 of providing a segment visualization of the emerging user segment for display within a graphical user interface of a client device. In some embodiments, the act 708 comprises providing, for display: the segment visualization of the emerging user segment as a recommended user segment for a user account and one or more additional segment visualizations of saved segments corresponding to the user account.

It is understood that the outlined acts in the series of acts 700 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 7, act(s) in the series of acts 700 may include an act of: providing, for display within the graphical user interface, an adding option to add the emerging user segment to a user account and a discard option to reject the emerging user segment for the user account; and based on receiving an indication of a user interaction with the adding option, displaying the segment visualization for the emerging user segment as a saved segment of the user account and save the emerging user segment on one or more memory devices; or based on receiving an indication of a user interaction with the discard option, removing, from display within the graphical user interface, the segment visualization for the emerging user segment as a recommended user segment and delete the emerging user segment from the one or more memory devices.

As another example of an additional act not shown in FIG. 7, act(s) in the series of acts 700 may include an act of: identifying candidate respondent attributes from a schematization mapping that maps survey response data to predefined fields; and identifying the respondent attributes by utilizing a machine-learning model to predict which candidate respondent attributes satisfy a deterministic threshold.

In yet another example of an additional act not shown in FIG. 7, act(s) in the series of acts 700 may include an act of performing a digital action for the emerging user segment by performing at least one of transmitting an electronic communication to one or more client devices associated with one or more users within the emerging user segment, generating a digital survey for the one or more users within the emerging user segment, sending the digital survey to the one or more client devices associated with the one or more users within the emerging user segment, updating segment characteristics for the emerging user segment, or generating a digital ticket for the one or more users within the emerging user segment.

As an additional example of an act not shown in FIG. 7, act(s) in the series of acts 700 may include an act of providing, for display within the graphical user interface, segment characteristics of the emerging user segment, the segment characteristics comprising at least one of a segment size or customer satisfaction score statistics. In certain implementations, the series of acts 700 further includes updating, within the graphical user interface, the segment characteristics based on a change to the segment characteristics.

As another example of an additional act not shown in FIG. 7, act(s) in the series of acts 700 may include an act of requesting, via a user interface prompt, user input from the client device to indicate the target outcome or the respondent attributes.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
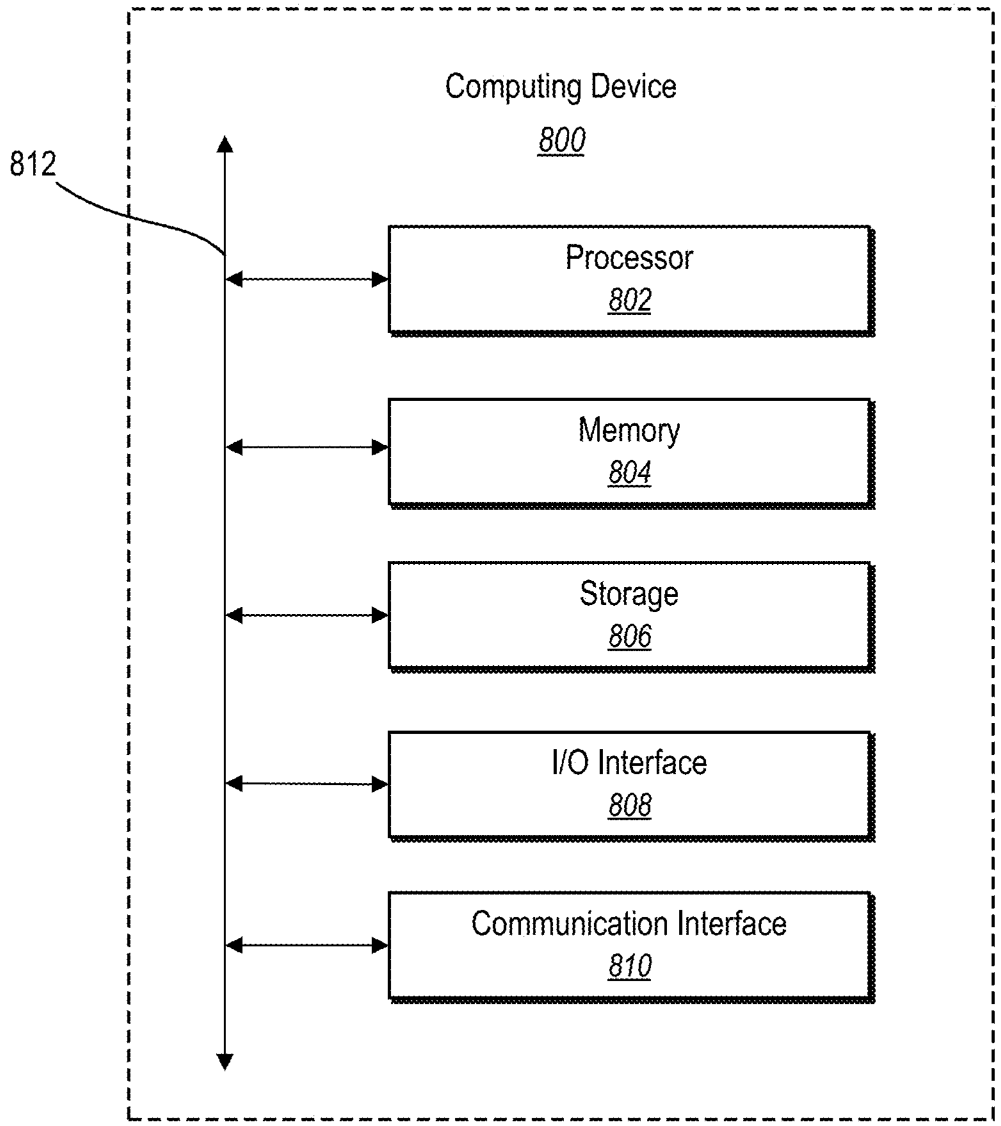
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 102, the administrator client device 106, the respondent client devices 107*a*-107*n*, the client devices 202, and/or the computing device 600). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

Figure 9:
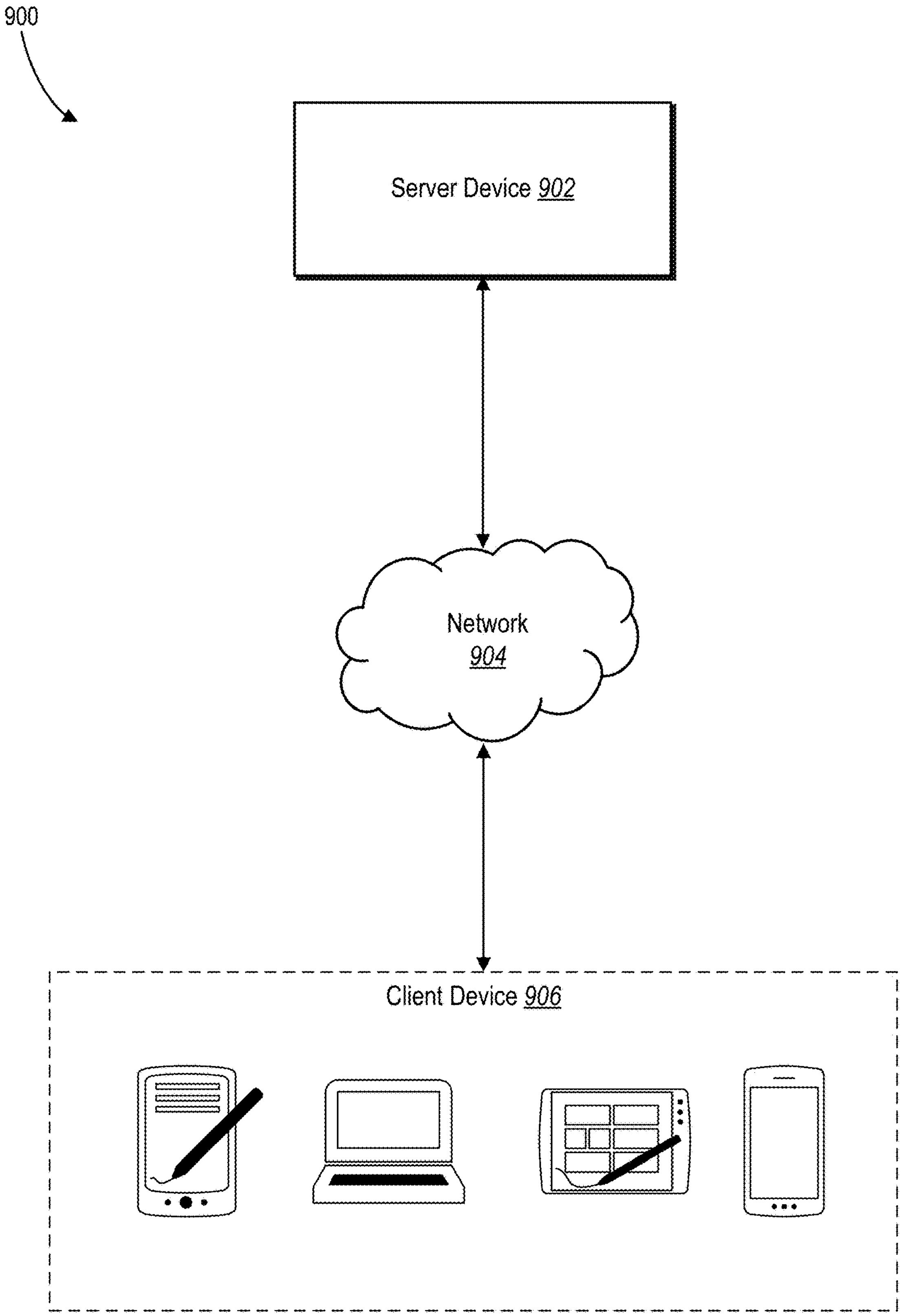
FIG. 9 illustrates a network environment of an emerging user segment system in accordance with one or more embodiments.

FIG. 9 illustrates an example network environment 900 of the emerging user segment system 104. Network environment 900 includes a server device 902 and client device 906 connected to each other by a network 904. Although FIG. 9 illustrates a particular arrangement of client device 906, server device 902, and network 904, this disclosure contemplates any suitable arrangement of client device 906, server device 902, and network 904. As an example and not by way of limitation, two or more of the client devices 906 and server device 902 may be connected to each other directly, bypassing network 904. As another example, two or more of client devices 906 and server device 902 may be physically or logically co-located with each other in whole, or in part. Moreover, although FIG. 9 illustrates a particular number of client devices 906, server device 902, and networks 904, this disclosure contemplates any suitable number of client devices 906, server device 902, and networks 904. As an example and not by way of limitation, network environment 900 may include multiple client devices 906, multiple server devices 902, and networks 904.

This disclosure contemplates any suitable network 904. As an example and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906 and server device 902 to network 904 or to each other. This disclosure contemplates any suitable links. In particular embodiments, one or more links include one or more wireline (such as for example Digital Subscriber Line ("DSL") or Data Over Cable Service Interface Specification ("DOC SIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 8. A client device 906 may enable a network user at client device 906 to access network 904.

In particular embodiments, client device 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 902 may include a variety of servers, sub-systems, programs, modules, logs, and data stores. In particular embodiments, server device 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 may also include suitable components such as network interfaces, security mechanisms, load balancers, failover servers, managementand-network-operations consoles, other suitable components, or any suitable combination thereof.

In particular embodiments, server device 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents, customers).

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:

identify a target outcome associated with survey responses to one or more digital surveys and respondent attributes associated with respondents;

determine, from the respondent attributes associated with the respondents, a set of deterministic attributes that satisfy a deterministic threshold indicating a threshold measure of confidence for attributes to be deterministic of the target outcome by using a machine-learning model that includes a gradient-based decision tree to determine which of the respondent attributes satisfy the deterministic threshold;

select a subset of survey responses provided by respondent devices of a subset of the respondents reflecting the set of deterministic attributes;

generate, based on determining the set of deterministic attributes that satisfy the deterministic threshold and utilizing the machine-learning model to process the subset of survey responses and the set of deterministic attributes, an emerging user segment based on the target outcome by:

identifying, using the machine-learning model to predict outcomes from the respondent attributes, a set of respondent users predicted to accomplish the target outcome; and determining a set of nonrespondent users associated with the set of deterministic attributes predicted by the machine-learning model to accomplish the target outcome by:

identifying a subset of the respondent attributes corresponding to the target outcome based on the subset of survey responses;

identifying the set of nonrespondent users by utilizing the machine-learning model to determine a semantic similarity between attributes of the set of nonrespondent users and the subset of the respondent attributes; and grouping the set of nonrespondent users within the emerging user segment based on determining the semantic similarity between attributes of the set of nonrespondent users and the subset of the respondent attributes;

provide, for display within a graphical user interface of a client device, a segment visualization of the emerging user segment including the set of respondent users and the set of nonrespondent users and a segment-options menu element selectable to modify the segment visualization according to a composition of the emerging user segment; and modify the segment visualization based on receiving an interaction with the segment-options menu element from the client device.

2. The non-transitory computer-readable storage medium of claim 1, further comprising instructions that, when executed by the at least one processor, cause the computing device to identify at least one of the target outcome or the respondent attributes based on user input from one or more client devices.

3. The non-transitory computer-readable storage medium of claim 1, further comprising instructions that, when executed by the at least one processor, cause the computing device to identify at least one of the target outcome or the respondent attributes based on industry characteristics or organization characteristics corresponding to an organization associated with the one or more digital surveys.

4. The non-transitory computer-readable storage medium of claim 1, further comprising instructions that, when executed by the at least one processor, cause the computing device to:

determine, utilizing the gradient-based decision tree of machine-learning model, the set of deterministic attributes by filtering the survey responses in a step-wise fashion to identify set of deterministic attributes from the survey responses; and utilize the machine-learning model to further process the set of deterministic attributes to identify the emerging user segment.

5. The non-transitory computer-readable storage medium of claim 1, further comprising instructions that, when executed by the at least one processor, cause the computing device to select the subset of survey responses that satisfy both the target outcome and at least one respondent attribute.

6. The non-transitory computer-readable storage medium of claim 1, further comprising instructions that, when executed by the at least one processor, cause the computing device to provide, for display within the graphical user interface:

the segment visualization of the emerging user segment as a recommended user segment for a user account; and one or more additional segment visualizations of saved segments corresponding to the user account.

7. The non-transitory computer-readable storage medium of claim 1, further comprising instructions that, when executed by the at least one processor, cause the computing device to:

provide, for display within the graphical user interface, an adding option to add the emerging user segment to a user account and a discard option to reject the emerging user segment for the user account; and based on receiving an indication of a user interaction with the adding option, display the segment visualization for the emerging user segment as a saved segment of the user account and save the emerging user segment on one or more memory devices; or based on receiving an indication of a user interaction with the discard option, remove, from display within the graphical user interface, the segment visualization for the emerging user segment as a recommended user segment and delete the emerging user segment from the one or more memory devices.

8. A system comprising:

at least one processor; and at least one non-transitory computer-readable storage medium storing instructions that, when executed by the at least one processor, cause the system to:

identify a target outcome associated with survey responses to one or more digital surveys and respondent attributes associated with respondents;

determine, from the respondent attributes associated with the respondents, a set of deterministic attributes that satisfy a deterministic threshold indicating a threshold measure of confidence for attributes to be deterministic of the target outcome by using a machine-learning model that includes a gradient-based decision tree to determine which of the respondent attributes satisfy the deterministic threshold;

select a subset of survey responses provided by respondent devices of a subset of the respondents reflecting the set of deterministic attributes;

generate, based on determining the set of deterministic attributes that satisfy the deterministic threshold and utilizing the machine-learning model to process the subset of survey responses and the set of deterministic attributes, an emerging user segment based on the target outcome by:

identifying, using the machine-learning model to predict outcomes from the respondent attributes, a set of respondent users predicted to accomplish the target outcome; and determining a set of nonrespondent users associated with the set of deterministic attributes predicted by the machine-learning model to accomplish the target outcome by:

identifying a subset of the respondent attributes corresponding to the target outcome based on the subset of survey responses;

identifying the set of nonrespondent users by utilizing the machine-learning model to determine a semantic similarity between attributes of the set of nonrespondent users and the subset of the respondent attributes; and grouping the set of nonrespondent users within the emerging user segment based on determining the semantic similarity between attributes of the set of nonrespondent users and the subset of the respondent attributes;

provide, for display within a graphical user interface of a client device, a segment visualization of the emerging user segment including the set of respondent users and the set of nonrespondent users and a segment-options menu element selectable to modify the segment visualization according to a composition of the emerging user segment; and modify the segment visualization based on receiving an interaction with the segment-options menu element from the client device.

9. The system of claim 8, further comprising instructions that, when executed by the at least one processor, cause the system to identify the target outcome by identifying at least one of a range of customer satisfaction scores in response to the one or more digital surveys or a chance that users exit an organization.

10. The system of claim 8, further comprising instructions that, when executed by the at least one processor, cause the system to:

identify candidate respondent attributes from a schematization mapping that maps survey response data to predefined fields; and identify the respondent attributes by utilizing the machine-learning model to predict which candidate respondent attributes satisfy the deterministic threshold.

11. The system of claim 8, further comprising instructions that, when executed by the at least one processor, cause the system to:

determine, utilizing the gradient-based decision tree of machine-learning model, the set of deterministic attributes by filtering the survey responses in a step-wise fashion to identify set of deterministic attributes from the survey responses; and utilize the machine-learning model to further process the set of deterministic attributes to identify the emerging user segment.

12. The system of claim 8, further comprising instructions that, when executed by the at least one processor, cause the system to perform a digital action for the emerging user segment by performing at least one of transmitting an electronic communication to one or more client devices associated with one or more users within the emerging user segment, generating a digital survey for the one or more users within the emerging user segment, sending the digital survey to the one or more client devices associated with the one or more users within the emerging user segment, updating segment characteristics for the emerging user segment, or generating a digital ticket for the one or more users within the emerging user segment.

13. The system of claim 8, further comprising instructions that, when executed by the at least one processor, cause the system to provide, for display within the graphical user interface, segment characteristics of the emerging user segment, the segment characteristics comprising at least one of a segment size or customer satisfaction score statistics.

14. A method comprising:

identifying a target outcome associated with survey responses to one or more digital surveys and respondent attributes associated with respondents;

determine, from the respondent attributes associated with the respondents, a set of deterministic attributes that satisfy a deterministic threshold indicating a threshold measure of confidence for attributes to be deterministic of the target outcome by using a machine-learning model that includes a gradient-based decision tree to determine which of the respondent attributes satisfy the deterministic threshold;

selecting a subset of survey responses provided by respondent devices of a subset of the respondents reflecting the set of deterministic attributes;

generating, based on determining the set of deterministic attributes that satisfy the deterministic threshold and utilizing the machine-learning model to process the subset of survey responses and the set of deterministic attributes, an emerging user segment based on the target outcome by:

identifying, using the machine-learning model to predict outcomes from the respondent attributes, a set of respondent users predicted to accomplish the target outcome; and determining a set of nonrespondent users associated with the set of deterministic attributes predicted by the machine-learning model to accomplish the target outcome by:

identifying a subset of the respondent attributes corresponding to the target outcome based on the subset of survey responses;

identifying the set of nonrespondent users by utilizing the machine-learning model to determine a semantic similarity between attributes of the set of nonrespondent users and the subset of the respondent attributes; and grouping the set of nonrespondent users within the emerging user segment based on determining the semantic similarity between attributes of the set of nonrespondent users and the subset of the respondent attributes;

providing, for display within a graphical user interface of a client device, a segment visualization of the emerging user segment including the set of respondent users and the set of nonrespondent users and a segment-options menu element selectable to modify the segment visualization according to a composition of the emerging user segment; and modifying the segment visualization based on receiving an interaction with the segment-options menu element from the client device.

15. The method of claim 14, wherein identifying the target outcome comprises identifying one or more customer satisfaction scores in response to the one or more digital surveys based on a customer-satisfaction-score threshold.

16. The method of claim 14, wherein identifying the target outcome comprises identifying a probability that users exit an organization based on a user-exit-threshold probability.

17. The method of claim 14, further comprising:

determining, utilizing the gradient-based decision tree of machine-learning model, the set of deterministic attributes by filtering the survey responses in a step-wise fashion to identify set of deterministic attributes from the survey responses; and utilizing the machine-learning model to further process the set of deterministic attributes to identify the emerging user segment.

18. The method of claim 14, wherein providing the segment visualization of the emerging user segment for display comprises providing, for display within the graphical user interface, segment characteristics of the emerging user segment, the segment characteristics comprising at least one of a segment size or customer satisfaction score statistics; and the method further comprising updating, within the graphical user interface, the segment characteristics based on a change to the segment characteristics.

19. The method of claim 14, wherein providing the segment visualization of the emerging user segment for display comprises:

providing, for display, an adding option to add the emerging user segment to a dashboard user interface; and in response to detecting a user interaction with the adding option, adding the emerging user segment for display as a saved segment to the dashboard user interface.

20. The method of claim 14, further comprising requesting, via a user interface prompt, user input from the client device to indicate the target outcome or the respondent attributes.

* * * * *